(12) United States Patent
Mihara et al.

(10) Patent No.: US 7,253,834 B2
(45) Date of Patent: Aug. 7, 2007

(54) IMAGE PICKUP APPARATUS HAVING IMAGE PICKUP OPTICAL SYSTEM

(75) Inventors: Shinichi Mihara, Tama (JP); Masahito Watanabe, Hachioji (JP); Tomoyuki Satori, Kawagoe (JP); Toyoharu Hanzawa, Mitaka (JP); Shigeru Kato, Tachikawa (JP)

(73) Assignee: Olympus Corporation, Tokyo (JP)

( * ) Notice: Subject to any disclaimer, the term of this patent is extended or adjusted under 35 U.S.C. 154(b) by 910 days.

(21) Appl. No.: 10/101,636

(22) Filed: Mar. 20, 2002

(65) Prior Publication Data

US 2002/0136150 A1  Sep. 26, 2002

(30) Foreign Application Priority Data

Mar. 21, 2001  (JP) .............................. 2001-080189

(51) Int. Cl.
*H04N 5/228* (2006.01)
*H04N 5/225* (2006.01)
*G02B 27/64* (2006.01)
*G02B 5/10* (2006.01)

(52) U.S. Cl. ............................ 348/208.11; 348/208.14; 348/335; 359/555; 359/846

(58) Field of Classification Search ................ 348/142, 348/146, 147, 208.99, 208.7, 208.8, 208.11, 348/208.12, 208.14, 335, 340; 359/197, 359/214, 224, 223, 555, 846, 389, 690, 847, 359/689
See application file for complete search history.

(56) References Cited

U.S. PATENT DOCUMENTS

| | | | | |
|---|---|---|---|---|
| 4,655,563 A | * | 4/1987 | Plante et al. ................. | 359/849 |
| 4,734,557 A | * | 3/1988 | Alfille et al. ............... | 359/849 |
| 4,993,823 A | * | 2/1991 | Schaffer et al. ............. | 359/849 |
| 5,032,013 A | * | 7/1991 | Shibayama .................. | 359/676 |
| 5,229,889 A | * | 7/1993 | Kittell ......................... | 359/849 |
| 5,345,287 A | * | 9/1994 | Taguchi ....................... | 396/378 |
| 5,396,367 A | * | 3/1995 | Ono et al. ................... | 348/240.3 |

(Continued)

FOREIGN PATENT DOCUMENTS

EP  961149 A2 * 12/1999

(Continued)

OTHER PUBLICATIONS

Hardy, John W.; "Active Optics: A New Technology for the Control of Light"; Jun. 1978; Proceedings of the IEEE; vol. 66, No. 6.*

(Continued)

*Primary Examiner*—John M. Villecco
(74) *Attorney, Agent, or Firm*—Pillsbury Winthrop Shaw Pittman LLP

(57) ABSTRACT

An image pickup apparatus comprising a first lens unit which comprises at least a negative lens element and at least a positive lens element and has negative refractive power, a second lens unit which has positive refractive power, and an optical path bending reflecting optical element which has a variable reflecting surface disposed in an airspace between a most object side lens component of the first lens unit and a most object side lens component of the second lens unit. This image pickup apparatus changes a magnification by moving the second lens unit along an optical axis and corrects a deviation of an image location by varying a shape of the variable reflecting surface of the reflecting optical element.

22 Claims, 22 Drawing Sheets

U.S. PATENT DOCUMENTS

| | | | | |
|---|---|---|---|---|
| 5,414,564 | A * | 5/1995 | Pausch et al. | 359/849 |
| 5,986,795 | A * | 11/1999 | Chapman et al. | 359/849 |
| 6,130,993 | A * | 10/2000 | Hayakawa | 396/55 |
| 6,163,411 | A * | 12/2000 | Tsuchida | 359/690 |
| 6,233,099 | B1 * | 5/2001 | Itoh | 359/781 |
| 6,333,823 | B1 * | 12/2001 | Ozaki et al. | 359/690 |
| 6,339,508 | B1 * | 1/2002 | Nozawa et al. | 359/691 |
| 6,362,925 | B1 * | 3/2002 | Nakamura et al. | 359/684 |
| 6,411,426 | B1 * | 6/2002 | Meehan et al. | 359/291 |
| 6,452,145 | B1 * | 9/2002 | Graves et al. | 250/201.9 |
| 6,618,209 | B2 * | 9/2003 | Nishioka et al. | 359/676 |
| 6,747,813 | B2 * | 6/2004 | Wakai et al. | 348/347 |
| 6,778,329 | B2 * | 8/2004 | Ozaki | 359/690 |
| 6,801,260 | B1 * | 10/2004 | Veksland et al. | 348/340 |
| 6,829,011 | B1 * | 12/2004 | Higuchi et al. | 348/340 |
| 6,842,277 | B2 * | 1/2005 | Watson | 359/849 |
| 6,914,729 | B2 * | 7/2005 | Mikami | 359/696 |
| 6,952,304 | B2 * | 10/2005 | Mushika et al. | 359/847 |
| 6,989,922 | B2 * | 1/2006 | Phillips et al. | 359/290 |
| 7,054,048 | B2 * | 5/2006 | Arima | 359/849 |
| 7,054,075 | B2 * | 5/2006 | Nishioka et al. | 359/846 |
| 7,085,073 | B1 * | 8/2006 | Han et al. | 359/690 |
| 2002/0057506 | A1 * | 5/2002 | Kaneko | 359/846 |
| 2002/0097509 | A1 * | 7/2002 | Graves et al. | 359/811 |
| 2003/0227561 | A1 * | 12/2003 | Sakata et al. | 348/335 |
| 2004/0119867 | A1 * | 6/2004 | Nishioka et al. | 348/333.01 |
| 2005/0023573 | A1 * | 2/2005 | Govil et al. | 257/223 |
| 2005/0057659 | A1 * | 3/2005 | Hasegawa | 348/208.11 |
| 2005/0206737 | A1 * | 9/2005 | Gim et al. | 348/208.11 |
| 2006/0055997 | A1 * | 3/2006 | Murakami | 359/224 |
| 2006/0109552 | A1 * | 5/2006 | Hidaka | 359/555 |
| 2006/0176538 | A1 * | 8/2006 | Hirayama et al. | 359/223 |
| 2006/0193065 | A1 * | 8/2006 | Novak | 359/849 |
| 2006/0232866 | A1 * | 10/2006 | Sai et al. | 359/849 |
| 2007/0014039 | A1 * | 1/2007 | Chiu et al. | 359/849 |

FOREIGN PATENT DOCUMENTS

| | | | | |
|---|---|---|---|---|
| GB | 2128733 | A * | 5/1984 | |
| JP | 11064817 | A | 3/1999 | |
| JP | 2000267010 | A | 9/2000 | |
| JP | 2000298237 | A | 10/2000 | |

OTHER PUBLICATIONS

Divoux, C. et al.; "Deformable Mirror using Magnetic Membranes: Application to Adaptive Optics in Astrophysics"; Sep. 1998; IEEE Transactions on Magnetics; vol. 34, No. 5.*

Tuantranont A. et al.; "Segmented Silicon-Micromachined Microelectromechanical Deformable Mirrors for Adaptive Optics"; Jan./Feb. 2002; IEEE Journal on Selected Topics in Quantum Electronics; vol. 8, No. 1.*

Himmer, P. et al.; "High Speed, Large Deflection Deformable Mirrors for Focus and Spherical Aberration Control"; Aug. 20-23, 2002; 2002 IEEE/LEOS International Conference on Optical MEMs; pp. 193-194.*

* cited by examiner

CCD(A)   CCD(B)

CCD(A)   VM1   VM2

IMAGE PICKUP APPARATUS HAVING IMAGE PICKUP OPTICAL SYSTEM

CROSS REFERENCE TO RELATED APPLICATIONS

This application claims priority to Japanese application No. 2001-080189, filed Mar. 21, 2001, the contents of which is incorporated herein in its entirety by reference.

BACKGROUND OF THE INVENTION a) Field of the Invention

The present invention relates to an improvement in an optical system which is included in a photographic system, a view finder system, automatic exposure control system, an automatic focusing auxiliary light illumination system or the like for an image pickup apparatus such as a film camera, a digital camera, a video camera or the like.

b) Description of the Prior Art

Demands for thinner configurations of image pickup apparatuses such as film cameras, digital cameras, video cameras and the like become higher and higher year by year. It is therefore important to shorten total lengths of optical systems such as photographic optical systems and view finder optical systems to be used in the image pickup apparatuses.

Since there lies a limit in shortening a total length of such an optical system by reducing a number of compositional lens elements, it is attempted to shorten a total length by bending an optical system using a mirror.

For bending an optical system, however, it is necessary to reserve a space for a bent portion, and a space for moving lens units in a zoom optical system or moving lens unit(s) for focusing in particular is apt to be insufficient, thereby making it difficult to obtain a required zoom ratio and shorten an extremely short distance. In case of a view finder, it is difficult to shorten a total length since a space must be reserved for moving a lens unit to adjust or correct diopter.

Furthermore, it is desirable for automatic exposure control of an image pickup apparatus to make variable a weighted coefficient distribution for the so-called weighted mean light measurement according to a program of what portion of a photographing range of an object is to be considered at what ratio. There are adopted, for example, a center weighted mean light measurement, spot light measurement and the like. For carrying out such a variable weighted mean light measurement, it is effective to change a focus point location of a condenser lens component which condenses rays on a sensor. In such a case, it is necessary to use a mechanism which changes a relative positional relation between the condenser lens component and the sensor, thereby complicating an image pickup apparatus.

On the other hand, zoom lens systems nowadays constitute a main current of photographic optical systems for image pickup apparatuses and when an exclusive condenser optical system has a single focal point, a light measuring area is changed relative to a photographing range of an object by zooming, whereby the center weighted mean light measurement at a wide position may be a mean light measurement at a tele position. In such a case, a condenser lens component which condenses rays on a sensor in a light measuring system must have a vari-focal function. When the condenser lens has the vari-focal function, however, a magnification changing mechanism of the light measuring system is complicated and when the condenser lens component is interlocked with a zoom lens system of a photographic system, the mechanism is more complicated.

Digital cameras (electronic cameras) have recently been attracting attention as cameras of a next generation which are to substitute for silver salt 35 mm film cameras (Leica camera by popular name).

An effective image pickup surface of an image pickup device generally used for a digital camera has a size which is much smaller than that of a silver salt film. Therefore, the image pickup device has defect that it has too large a depth of field can hardly provide an effect of defocus. In contrast, there is a case where pan-focus is desired.

In order to realize these effects, there is conceivable a method to carry out an image processing so as to change an apparent depth of field by composing image data of an identical scene having focus points which are different little by little. In such a case, however, it is necessary to obtain a plurality of image data in a short time and at a high speed while changing a focus point.

It is therefore necessary to contrive optical systems at respective portions of an image pickup apparatus such as a camera, thereby not only thinning a photographic system, a view finder system, a light measuring system, a range finding system at the respective portions but also enhancing performance of these systems.

In other words, it is necessary to configure the photographic system so as to exhibit predetermined performance of use even when an optical path is bent, remove a moving space for diopter adjustment in the view finder system, configure the light measuring system without complicating a mechanism so as to be capable of changing a focal length of a condense lens having a simple composition so as to make variable a weight coefficient distribution for the weighted mean light measurement according to a program of what portion of a photographic range of an object is to be considered at what degree.

The light measuring system is configured so as to be capable of changing a focal length of a condenser lens system in order to change a distribution of weight coefficients in accordance with a magnification change of the photographic optical system.

Furthermore, it is necessary to configure the light measuring system so as to be capable of obtaining desired distributions of weight coefficients from a wide position to a tele position in conjunction with a magnification change of a zoom lens system.

Furthermore, a light projector optical system of the range finding system is configured so as to have a simple composition without complicating a mechanism and be capable of changing a magnification of the light projector optical system in conjunction with a magnification of the photographic optical system, and optimalizing a range finding region from the wide position to the tele position.

Furthermore, it is necessary to obtain means for obtaining an image on which defocuses before and after a focus point are emphasized by reducing an apparent depth of field of an image photographed with an image pickup apparatus which uses an image pickup device having a small effective image pickup surface size.

SUMMARY OF THE INVENTION

An object of the present invention is to provide an image pickup apparatus which comprises at least a view finder system, an automatic exposure control system, an automatic focusing mechanism and an optical path bending reflecting member which has an optical element having a variable shape included in optical systems comprised in these systems, and is configured to be capable of performing correction of an image location, focusing and the like at a zooming stage by varying the shape of a reflecting surface of the optical element having the variable shape.

Another object of the present invention is to provide an image pickup apparatus comprising an optical system which comprises a first lens unit disposed at a stationary location, comprising a negative lens element and a positive lens element and having negative refractive power and a second lens unit having positive refractive power, an optical path bending reflecting surface having a variable shape disposed between a most object side lens component and a second lens unit of the first lens unit, and is configured to change mainly a magnification by moving only the second lens unit and correct a deviation of an image location during a magnification change by varying the shape of the reflecting surface.

Another object of the present invention is to provide an image pickup apparatus which comprises a first lens unit having positive refractive power, a second lens unit having negative refractive power and an optical path bending reflecting surface having a variable shape disposed on the image side of a most image side lens component of the second lens unit, and is configured to change a magnification by moving the second lens unit along an optical axis and correct a deviation of an image location by varying the shape of the reflecting surface during a magnification change.

Another object of the present invention is to provide an image pickup apparatus which comprises a first lens unit having positive or negative refractive power, a second lens unit having negative refractive power, a third lens unit having positive refractive power and an optical path bending reflecting surface having a variable shape disposed on the object side of a most object side lens component of the second lens unit, and is configured to change a magnification by moving at least the third lens unit and vary the shape of the reflecting surface by moving the third lens unit for correcting a deviation of an image location during the magnification change.

Another object of the present invention is to provide an image pickup apparatus comprising a photographic optical system and a view finder which comprises, in order from the object side along an optical axis, an objective lens system, an eyepiece system and image erecting reflecting mirrors, and is configured to form a real image between the objective lens system and the view finder: one of the image erecting reflecting mirror having a variable shape.

Another object of the present invention is to provide an image pickup apparatus comprising a photographic optical system and a light measuring optical system for range finding which has a function to determine an exposure time by measuring a light amount as a weighted mean of light amounts at location within a photographing range of an object to be photographed with the photographic optical system.

Another object of the present invention is to provide an image pickup apparatus comprising a photographic optical system, and a light source, a light projector optical system and a light measuring optical system for range finding: the light projector optical system being an optical system consisting of a light projector optical system and an optical path bending reflecting optical element or an optical path bending reflecting optical element and a light projector optical system which are disposed in this order between the light source and an object to be photographed by the photographic optical system, and the reflecting optical element being a reflecting optical element having a variable shape.

Still another object of the present invention is to provide an image pickup apparatus which comprises a photographic optical system, an image pickup device, an optical path bending reflecting optical element having a variable shape disposed between an object and the image pickup device, and a control system for controlling a variation of the shape of the reflecting optical element.

A further object of the present invention is to provide an image pickup apparatus comprising left and right photographic optical systems which are disposed side by side, and a plurality of reflecting optical elements which are disposed on the object side of the photographic optical systems respectively for giving parallax between left and right sides.

DETAILED DESCRIPTION OF THE PREFERRED EMBODIMENTS

Figure 1:
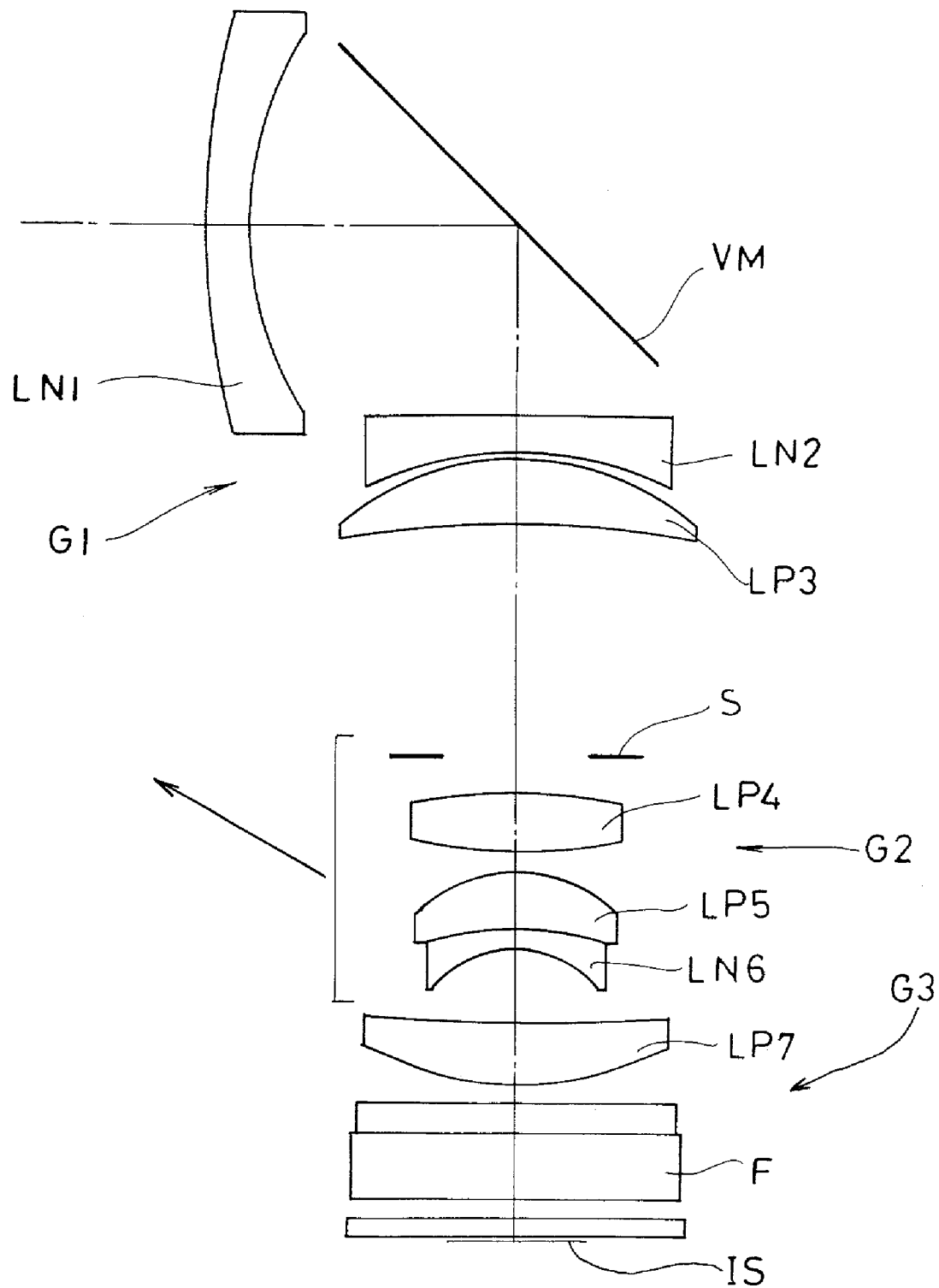
FIGS. 1 to 4 are sectional views showing photographic optical systems to be used in first to fourth embodiments of the image pickup apparatus of the present invention.

An image pickup apparatus which has a first composition according to the present invention comprises an optical system (photographic lens system) which comprises a first lens unit disposed at a fixed location, comprising at least a negative lens element and at least a positive lens element and having negative refractive power, a second lens unit having positive refractive power, and an optical path bending reflecting surface having a variable shape which is disposed between a most object side lens component of the first lens unit and a most object side lens component of the second lens unit, performs mainly a magnification change by moving only the second lens unit, and corrects a deviation of an image location by varying the shape of the reflecting surface during the magnification change.

The optical system of the image pickup apparatus according to the present invention is configured on the basis of a typical type photographic optical system for digital cameras, or a zoom type lens system which comprises a first lens unit having negative refractive power and a composite system on and after a second lens unit having positive refractive power, comprises, in order from the object side, a first lens unit disposed at a fixed location, comprising at least a negative lens element and at least a positive lens element and having negative refractive power, a second lens unit having positive refractive power and an optical path bending reflecting surface having a variable shape disposed between a most object side lens component of the first lens unit and a most object side lens component of the second lens unit, performs mainly a magnification changing function by moving only the second lens unit along an optical axis and corrects a deviation of an image location during a magnification change by varying the shape of the reflecting surface.

An ordinary zoom lens system which consists of a first lens unit having negative refractive power and a rear lens group on and after a second lens unit having positive refractive power as a whole moves the second lens unit on the object side to change a magnification from a wide position to a tele position and corrects a deviation of a focal point location caused due to the magnification change by moving the first lens unit monotonously on the image side or while tracing a locus convex on the image side.

The photographic optical system used in the image pickup apparatus according to the present invention is configured to use the first lens unit disposed at the fixed location, and adopts instead the optical path bending reflecting surface having the variable shape and a control system which is capable of freely varying the shape of the reflecting surface, thereby correcting the deviation of the focal point location (deviation of an image surface) caused during a magnification change. Furthermore, the photographic optical system is configured to perform also focusing by varying the shape of the reflecting surface having the variable shape.

This reflecting surface (the optical path bending reflecting optical element) consists, for example, of a thin film which has a reflecting surface coated with a metal as described later, is connected to a power source by way of a plurality of electrodes and variable resistors, and has an arithmetical unit for controlling resistance values of the variable resistors so that the shape of the reflecting surface is varied by controlling a distribution of electrostatic forces applied to the thin film.

An optical system which corrects a focal point location by varying a shape of a reflecting surface like the above described optical system has a correcting capability lower than that of an optical system which corrects a focal point location by mechanically moving a lens unit. It is therefore desirable to configure an optical system so as to have a power distribution which shortens a moving distance required for a focal point location of a composite system of the first lens unit itself and the reflecting optical element having the variable shape, that is, an object location of the composite system on and after the second lens unit so that a correction amount is as small as possible.

For this reason, it is desirable that the composite system on and after the second lens unit has a magnification satisfying the following condition;

$$0.5 < ABS(\beta W) < ABS(\beta T) < 1.8$$

wherein reference symbols $ABS(\beta W)$ and $ABS(\beta T)$ represent magnifications of the composite system on and after the second lens unit at the wide position and the tele position respectively.

This condition utilizes a fact that a deviation of a focal point location is generally small when magnifications of a composite system on and after a second lens unit are close to 1× at the wide position and the tele position respectively. If an upper limit or a lower limit of this condition is exceeded, a focal point location will have a large correction amount and cannot be corrected sufficiently by varying a shape of a reflecting optical element having a variable shape.

An image pickup apparatus which has a second composition according to the present invention adopts an optical system which comprises a first lens unit having positive refractive power, a second lens unit having negative refractive power and an optical path bending reflecting surface having a variable shape disposed on the image side of a most image side lens component of the second lens unit, and is configured to perform a magnification change by moving the second lens unit along an optical axis and correct a deviation of an image location during the magnification change by varying the shape of the reflecting surface.

The optical system of the image pickup apparatus which has the second composition is configured on the basis of a typical zoom type lens system for video cameras or one of types usable also for digital cameras comprising a first positive lens unit, a second negative lens unit and a third positive lens unit and characterized by comprising, in order from the object side, a first positive lens unit, a second negative lens unit and an optical path bending reflecting surface having a variable shape disposed on the image side of a most image side lens component of the second lens unit, performing a magnification change by moving the second lens unit along an optical axis and correcting a deviation of an focal point location caused during the magnification change by varying the shape of the above described reflecting surface. In this case, a number of lens components and moving spaces on the object side of a location of an optical path bent by the reflecting surface makes it impossible to say that the composition exhibits a sufficient effect for a thin configuration, but the composition makes it possible to configure a reflecting surface on and after the second lens unit as a reflecting surface having a variable shape, correct a deviation of a focal point location caused during a magnification change by varying the shape of the above described reflecting surface and perform controls such as focusing with the reflecting surface.

Furthermore, an image pickup apparatus which has a third composition according to the present invention uses an optical system which is configured to comprise, in order from the object side, a first lens unit having positive or negative refractive power, a second lens unit having negative refractive power, a third lens unit having positive refractive power and an optical path bending reflecting surface having a variable shape disposed on the object side of a most object side lens component of the second lens unit, and is configured to perform a magnification change by moving at least the third lens unit along an optical axis and vary the shape of the reflecting surface having the variable shape to correct a deviation of an image surface location caused during the magnification change.

The optical system used in the third composition is configured on the basis of the typical type lens system for video cameras or another zoom type lens system usable for digital cameras consisting of a first positive or negative lens unit, a second negative lens unit, a third positive lens unit and a fourth positive lens unit, comprises in order from the object side the first positive or negative lens unit disposed at a fixed location, the second negative lens unit, the third positive lens unit and the optical path bending reflecting surface having the variable shape disposed on the object side of the most object side lens component of the second lens unit, performs the magnification change by moving at least the third lens unit along the optical axis and corrects the deviation of the focal point location caused during the magnification change by varying the shape of the reflecting surface having the variable shape.

A zoom lens system which comprises a first lens unit having positive or negative refractive power, a second lens unit having negative refractive power and a third lens unit having positive refractive power ordinarily moves the third lens unit on the image side to change a magnification from a wide position to a tele position and corrects a deviation of a focal point location caused during the magnification change by moving all or some of lens units disposed on the image side of the third lens unit in a direction monotonously or while tracing a locus convex on the object side or the image side.

For thinning an image pickup apparatus by bending an optical path, it is preferable to dispose an optical path bending reflecting surface at any location between a most object side lens component of a first lens unit and a most object side lens component of a second lens unit. In such a case, a space for disposing the optical path bending electing surface makes a moving space for the second lens unit insufficient. A vari-focal ratio is lowered accordingly, but a control system is disposed to permit freely varying a shape of the optical path bending reflecting surface for making up for the lowered vari-focal ratio and a variation of a focal length of a composite system of the first lens unit itself, a reflecting optical element having a variable shape and the second lens unit itself is corrected by varying the shape of the reflecting surface.

Furthermore, it is also possible to bend an optical path by disposing a reflecting optical element having a variable shape at any location in and after the second lens unit and correct a deviation of a focal point location caused during a magnification change by varying the shape of the reflecting optical element. In this case also, focusing may be performed by varying the shape of the reflecting optical element having the variable shape. In this case, it is adequate to vary the shape of the reflecting optical element in a direction perpendicular to a first bending direction.

In addition, the second lens unit may be fixed so far as a large value can be given to a variation of a focal length of the composite system of the first lens unit, the optical element having a variable shape and the second lens unit by imparting a vari-focal function to lens unit(s) disposed after the second lens unit and disposing a reflecting optical element having a variable shape at any location between the most object side lens component of the first lens unit and the most object side lens component of the second lens unit.

For the optical system used in the image pickup apparatus according to the present invention described above, it is desirable that the control system for controlling the variation of the shape of the reflecting surface has additional functions described as the following items 1 to 7:

1. The control system has not only a function for changing a paraxial amount but also a function for correcting aberrations by varying the shape of the reflecting surface. For example, the control system determines a paraxial amount by components of low orders of a curved surface and corrects aberrations by components of high orders like a nature of an ordinary aspherical lens element whose paraxial amount is determined by a term of the second order of a formula expressing an aspherical surface and whose aberrations are corrected by terms of the fourth and higher orders.

2. The control system for controlling the shape of the reflecting surface has a function for control additionally with lens control data for preventing vibration. That is, it is possible to prevent vibration by varying a shape or an angle of a mirror surface instead of detecting a vibration amount of a lens system and mechanically correcting an image location so as to be immovable on an image surface. In order words, it is possible to perform vibration prevention with quick response by applying quick response of a mirror having a variable shape to a vibration prevention function.

3. The control system has a function for controlling the optical system so as to follow positional shift of a main object (for example, a celestial body) with time lapse during long exposure so that an image is nearly immovable on an image surface.

4. The control system has a function for controlling the optical system so as to be focused on a best fit curved surface (on which a sum of squares of depths at points is minimum, for example) from multi-point range finding data. A typical example is swing photographing which is effective for bringing the optical system into focus on an object which is not located on a single plane.

5. The control system has a function for controlling the optical system so as to be capable of changing aberration conditions for different modes such as a resolution emphasized mode, a distortion mode, a soft focus mode and the like. This function allows a user to select aberration conditions at his will at a certain degree.

6. The control system has a function for storing data corresponding to shape variation amounts of a mirror which is to be used for changing a focal length in accordance with changes of specifications for CCDs and the like to be used and controlling the optical system while considering the above described data in controlling a shape of a mirror having a variable shape. Though a digital camera must be matched with specifications for a CCD, this function allows specifications to be variable at a certain degree and to be modifiable including a size of a CCD.

7. The control system has a function for storing a paraxial amount of a photographic lens system and result data of curvature of field into memory means and controlling a shape of a mirror having a variable shape while considering the above described result data. This function more or less moderates narrowing of an allowable variation range of a result as picture elements are used in a larger number.

An image pickup apparatus which has a fourth composition according to the present invention comprises a view finder in addition to a photographic optical system; the view finder being a view finder of a type comprising, in order from the object side along an optical path, an objective lens system and an eyepiece system for forming a real image between the objective lens system and the eyepiece system, that is, a Keplerian view finder, and configured to correct diopter by freely varying a shape of one of image erecting reflecting surfaces. Though diopter can ordinarily be changed by moving all or some of lens components of an eyepiece system, an image pickup apparatus is thickened by moving spaces required of the lens components.

The view finder used in the image pickup apparatus according to the present invention therefore uses an eyepiece system which is fixed and one of image erecting reflecting surfaces which is configured as a reflecting optical element having a variable shape, and is configured to change diopter by varying the shape of the reflecting optical element. This image pickup apparatus permits selecting diopter at a user's will and is capable of automatically correcting diopter using a range finding result on a photographic system or zoom condition data.

When a photographic lens system has a high zoom ratio and a certain degree of magnification is reserved for a view finder at a wide position, the view finder inevitably has a high magnification at a tele position, whereby diopter is changed in too large an amount from an infinite distance to an extremely short distance when peeped through the view finder at the tele position. Furthermore, diopter is apt to be deviated largely at the wide position and the tele position.

It is sufficient for solving this problem to match diopter with a main object using a range finding result on a photographic lens system or automatically correct diopter for each focal length using zoom condition data. Though description has been made above of correction of diopter, it is possible to similarly correct parallax which is different dependently on focal lengths and object distances.

An image pickup apparatus which has a fifth composition according to the present invention comprises a light measuring system for performing range finding and the like which has a function for picking up an image of an object as well as a function for determining an exposure time by measuring a light amount as a weighted mean of light amounts at locations within a photographing range of an object at an image pickup stage and measures the light amount for the latter function. This light measuring system consists, in order from a side of the object, a condenser lens system, an optical path bending reflecting optical element and a photosensor or an optical path bending reflecting optical element, a condenser lens system and a photosensor. It is appropriate to configure an optical path bending reflecting optical element as a reflecting optical element having a variable shape, dispose a control system capable of freely varying the shape of the reflecting optical element in such a light measuring optical system so that a distribution of weight coefficients in a photographing range of an object is variable and use the light measuring optical system in an image pickup apparatus.

The image pickup apparatus can be configured so as to be capable of performing two or more of a spot light measurement, a multi-spot light measurement, center weighted light measurement and a pattern light measurement.

Furthermore, it is preferable that an image pickup apparatus which has a photographic optical system consisting of a zoom lens system is configured to comprise a control system which is capable of changing a light measuring range in conjunction with a change of a photographing range. Furthermore, an image pickup apparatus may be configured to have a function for trimming and outputting an image pickup range, that is, the so called electronic zoom function. In this case, it is preferable to configure the image pickup apparatus so as to comprise a control system which changes a light measuring range in conjunction with a change of a trimming range.

An optical path bending reflecting optical element consists of a thin film which has a reflecting surface coated with a metal and is connected to a power source by way of a plurality of electrodes and variable resistors, has an arithmetic unit for controlling resistance values of the variable resistors and varies a shape of the reflecting surface by controlling a distribution of electrostatic forces applied to the this film.

An image pickup apparatus which has a sixth composition according to the present invention comprises a light projector optical system for range finding, which is disposed separately from a photographic optical system, has a function to pick up an image of an object and a range finding function at an image pickup time, or is an optical system which consists of the light projector optical system and an optical path bending reflecting optical element or an optical path bending reflecting optical element and a light projector optical system arranged in this order between a light source and the object: the optical path bending reflecting optical element being a reflecting optical element having a variable shape and having a control system for controlling a shape variation. This control system is capable of changing a light projection range or a light projection location on the object. In a case where an image pickup optical system of an image pickup apparatus is a zoom lens system in particular, it is possible to optimize a light measuring region from a wide position to a tele position by configuring the image pickup apparatus so as to comprise a control system which is capable of changing a light projection range or a light projection location on an object in conjunction with a change of a photographing range of the zoom lens system. When an image pickup system has the function for trimming and outputting a photographing range (the so-called electronic zoom function), it is proper to configure the image pickup apparatus so as to comprise a control system which is capable of changing a light projection range or a light projection location on an object.

An image pickup apparatus which has a seventh composition according to the present invention comprises an imaging optical system for photographing and an image pickup device for photographing, a reflecting optical element which bends an optical axis of the imaging optical system ranging from an object through the imaging optical system to the image pickup device and is configured as an optical element having a variable shape and a control system for freely varying the shape of the reflecting optical element, is capable of releasing a shutter and picking up images a plurality of times within a short time, and has a control system which is capable of freely varying the shape of the reflecting optical element at a high speed in conjunction with a shift of a focal point location from the image pickup device at each shutter release and makes it possible to photograph at a high speed a plurality of images of a nearly identical scene which have different focused points.

It is preferable to configure this image pickup apparatus so as to have a function which finally forms an image by composing the plurality of images of the nearly identical scene which have the different focused points and a function permitting freely changing a vignetted level dependently on a depth degree of the object so that the image pickup apparatus is capable of outputting data of the composed image. Moreover, the image pickup apparatus is applicable to animations and monitoring as well as inspections with a magnifying optical system having a shallow depth when the image pickup apparatus is configured to be capable of performing real time processing for the functions.

An image pickup apparatus which has an eighth composition according to the present invention is configured to be capable of obtaining a stereoscopic image. In other words, the image pickup apparatus which has the eighth composition comprises two left and right photographic optical systems which are arranged side by side and a plurality of reflecting optical elements which are disposed on the object side of the left and right photographic optical systems respectively for producing parallax between left and right sides, and is configured to image images of an identical object formed by the left and right photographic optical systems on a left half and a right half on the image side of the photographic optical systems with slightly different parallax between the left and right sides. Some of the reflecting optical elements disposed on the object side of the left and right photographic optical systems are configured to have reflecting surfaces variable in shapes or the like. Accordingly, the image pickup apparatus is capable of obtaining a desired stereoscopic image by controlling the reflecting surfaces of the reflecting optical elements variable in the shapes or the like so as to vary the shapes, positions or angles of the reflecting optical elements, thereby controlling a vergence angle or a focus point.

The reflecting surface variable in shape (reflecting surface of the reflecting optical element having the variable shape) used in the image pickup apparatus according to the present invention consists, for example, of a thin film or the like having a reflecting surface coated with a metal as described later with reference to drawings, which is connected to a power source by way of a plurality of electrodes and variable resistors, and has an arithmetic unit for controlling values of the variable resistors so that the shape of the reflecting surface is varied by controlling a distribution of electrostatic forces applied to the thin film.

FIG. 1 shows a composition of a first embodiment of the image pickup apparatus which has the first composition according to the present invention in a condition where the image pickup apparatus is focused on an object located at an infinite distance.

As shown in FIG. 1, an optical system used in the image pickup apparatus according to the first embodiment comprises, in order from the object side, a first lens unit G1 which consists of a negative lens element LN1, a mirror VM having a variable shape, a negative lens element LN2 and a positive lens element LP3 and has negative refractive power as a whole, a stop S, a second lens unit G2 which consists of a positive lens element LP4 and a cemented lens component consisting of a positive lens element LP5 and a negative lens element LN6, is moved along an optical axis for a magnification change and has positive refractive power as a whole, a third lens unit G3 which consists of a positive lens element LP7, filters F which consists of an infrared cut filter and a low pass filter, and a CCD. In addition, a reference symbol IS represents an image pickup surface of the CCD.

In other words, the optical system according to the first embodiment is an optical system which comprises the first lens unit G1 comprising two negative lens elements and a positive lens element, the second lens unit G2 having positive refractive power, the optical path bending reflecting optical element VM having the variable shape disposed between an object side lens element LN1 which is an object side lens component of the first lens unit and a lens element LP4 which is an object side lens component of the second lens unit G2, changes a magnification by moving only the second lens unit G2 and is to be used in the image pickup apparatus which has the first composition according to the present invention.

This optical system is configured to move the second lens unit G2 along the optical axis for changing the magnification and vary the shape of the variable shape mirror VM to change power of this mirror, thereby correcting a deviation of a location of an image surface caused due to the magnification change.

Furthermore, the optical system is focused on an object located at a short distance simply by varying the shape of the variable shape mirror VM.

Figure 2:
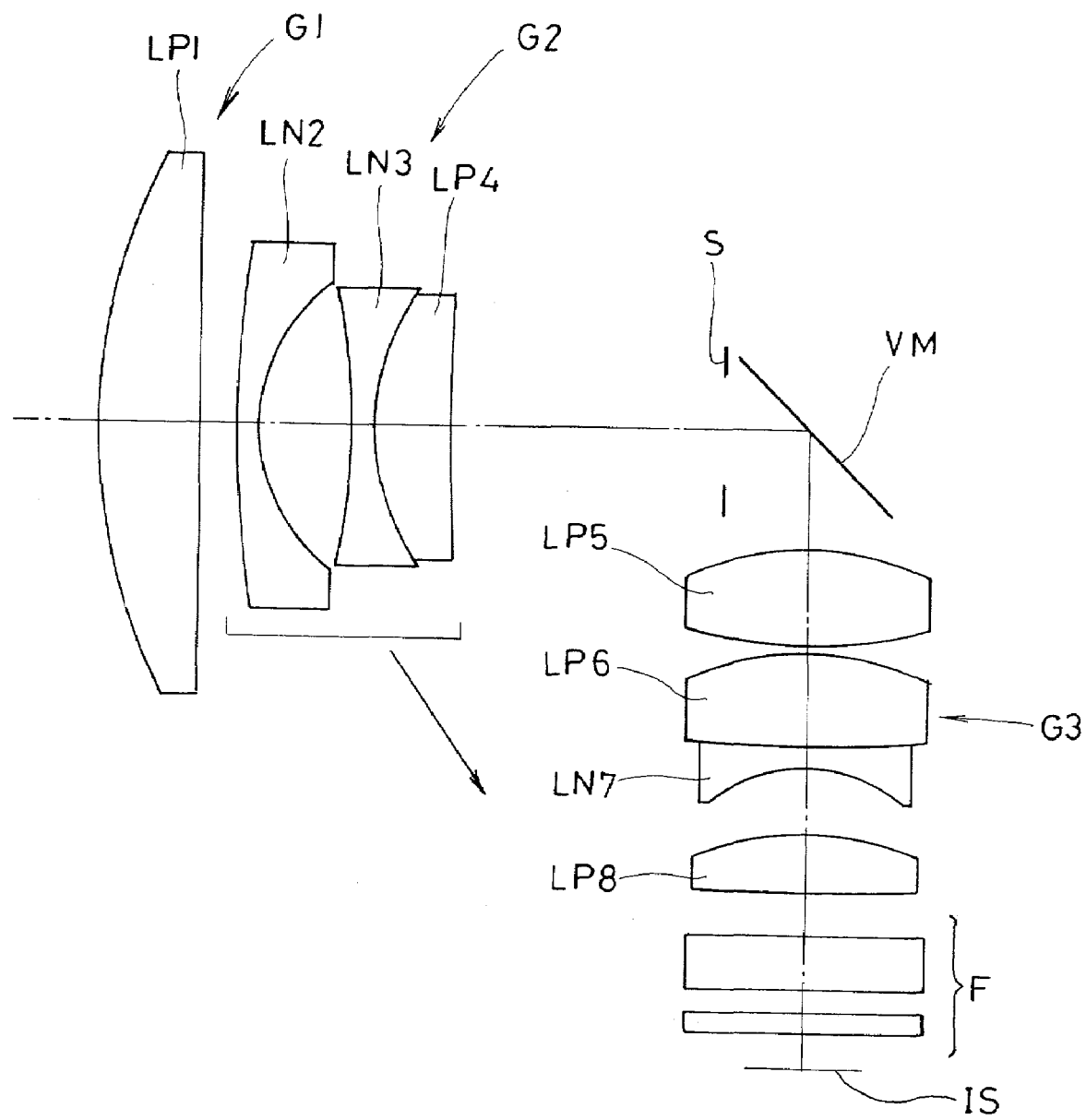

FIG. 2 shows a photographic optical system used in a second embodiment of the image pickup apparatus according to the present invention. The photographic optical system according to the second embodiment comprises a first lens unit G1 consisting of a positive lens element LP1, a second lens unit G2 consisting of a negative lens element LN2 and a cemented lens component which consists of a negative lens element LN3 and a positive lens element LP4 and has negative refractive power, a mirror VM which is used for bending an optical path and has a variable shape, a third lens unit G3 consisting of a positive lens element LP5, a cemented lens component which consists of a positive lens element LP6 and a negative lens element LN7 and has negative refractive power and a positive lens element LP8, filters F, and a CCD (only an image pickup surface IS is shown).

A photographic optical system according to the second embodiment comprises the first lens unit G1 having positive refractive power, the second lens unit G2 having negative refractive power and the optical path bending reflecting optical element having a variable shape disposed on the image side of a negative lens element which is a most image side lens component of the second lens unit G2, changes a magnification by moving the second lens unit G2 and is to be used in the second e composition according to the present invention.

The second embodiment is configured to change a magnification from a wide position W to a tele position T by moving the second lens unit G2 which is disposed on the object side of the optical path bending mirror VM along the optical axis as indicated by an arrow, and correct a deviation of an image location caused during the magnification change by varying a shape of the variable shape mirror VM.

Furthermore, the second embodiment is focused on an object located at a short distance simply by varying the shape of the variable shape mirror.

Figure 3:
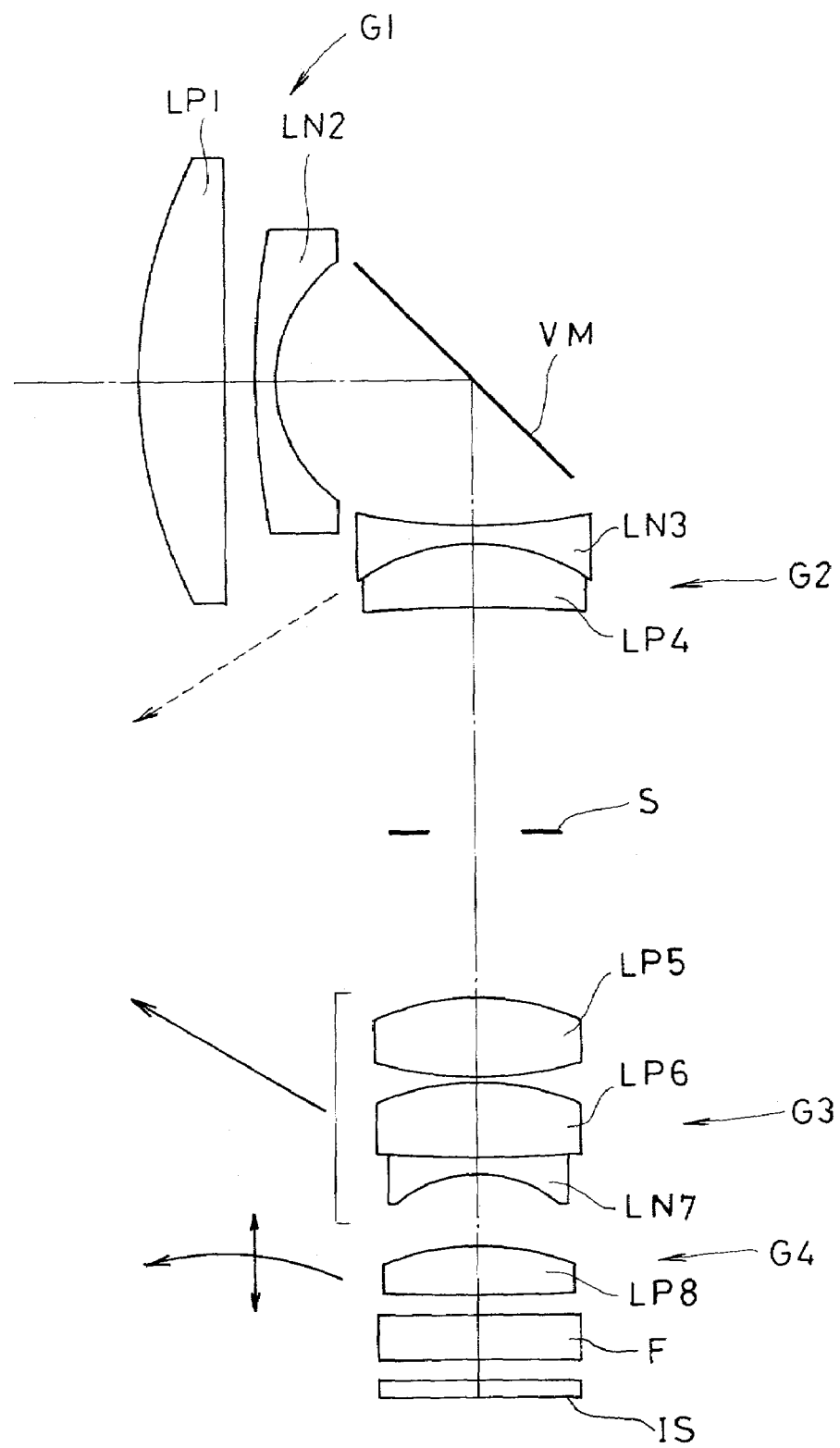

FIG. 3 shows a third embodiment of the image pickup apparatus according to the present invention. As shown in this drawing, a photographic optical system used in this image pickup apparatus comprises a first lens unit G1 which consists of a positive lens element LP1 and a negative lens element LN2, a variable shape mirror VM, a second lens unit G2 which consists of a cemented lens component consisting of a negative lens element LN3 and a positive lens element LP4, a stop S, a third lens unit G3 which consists of a positive lens element LP5, and a cemented lens component consisting of a positive lens element LP6 and a negative lens element LN7, a fourth lens unit G4 which consists of a positive lens element LP8, a filter F and a CCD (image pickup surface IS).

The photographic optical system according to the third embodiment comprises the first lens unit G1 having positive refractive power, the second lens unit G2 having negative refractive power and the third lens unit G3 having positive refractive power, changes a magnification by moving at least the third lens unit G3, uses the optical path bending reflecting optical element VM having the variable shape which is disposed on the object side of a most object side lens element LN3 of the second lens unit G2 and is to be used in the image pickup apparatus which has the third composition according to the present invention.

The optical system according to the third embodiment changes a magnification from a wide position to a tele position by moving the third lens unit G3 and the fourth lens unit G4 along an optical axis as indicated by an arrow in the drawing. During the magnification change, the optical system corrects a deviation of an image location by varying a shape of the mirror VM having the variable shape and moving the second lens unit G2 along the optical axis as indicated by an arrow (traced in a dashed line).

In addition, the second lens unit may be moved or fixed during the magnification change.

Figure 4:
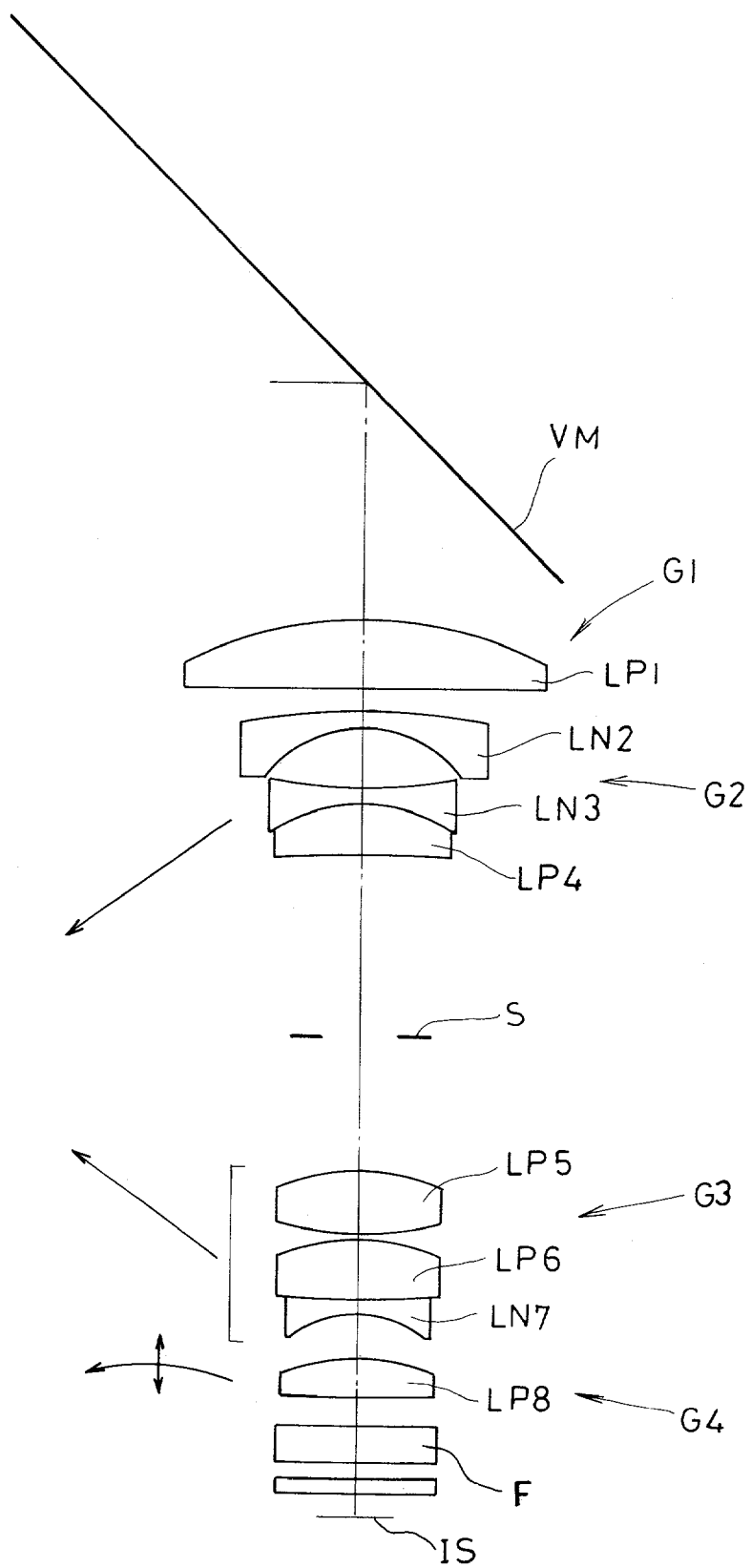

FIG. 4 is a sectional view illustrating a fourth embodiment of the image pickup apparatus according to the present invention.

The fourth embodiment has a composition similar to that of the third embodiment or is an image pickup apparatus comprising an optical system which has the third composition according to the present invention, but is different from the third embodiment in that the fourth embodiment uses a mirror VM having a variable shape which is disposed on a most object side in the optical system.

In other words, a photographic optical system according to the fourth embodiment comprises, in order from the object side, a mirror VM having a variable shape, a first lens unit G1 which consists of a positive lens element LP1, a second lens unit G2 which consists of a negative lens element LN2 and a cemented lens component consisting of a negative lens element LN3 and a positive lens element LP4, a stop S, a third lens unit G3 which consists of a positive lens element LP5 and a cemented lens component consisting of a positive lens element LP6 and a negative lens element LN7, and a fourth lens unit G4 which consists of a positive lens element LP8, changes a magnification location by moving the fourth lens unit or varying the shape of the mirror VM having the variable shape.

It is possible for each of the image pickup apparatuses according to the first through fourth embodiments shown in FIGS. 1 through 4 not only to change a paraxial amount such as surface power but also to correct aberrations by varying the shape of the mirror having the variable shape. Furthermore, it is preferable to configure the mirror so as to have an aspherical surface within an effective surface of the reflecting surface. In a case where the reflecting surface has power in particular, eccentric aberrations will be produced if the reflecting surface has rotationally symmetric shape and a light bundle is incident eccentrically on this reflecting surface. It is therefore preferable to configure the reflecting surface of the mirror having the variable shape so as to have a curved surface which is not rotationally symmetric.

Furthermore, off axial rays produce distortion which is not rotationally symmetric when a light bundle is incident eccentrically as described above. In order to correct eccentric aberrations produced due to eccentricity, the reflecting surface of the mirror having the variable shape is configured as a curved surface which is symmetric with regard to only a plane including optical axes of rays incident and reflected onto and by the reflecting surface.

Figure 5:
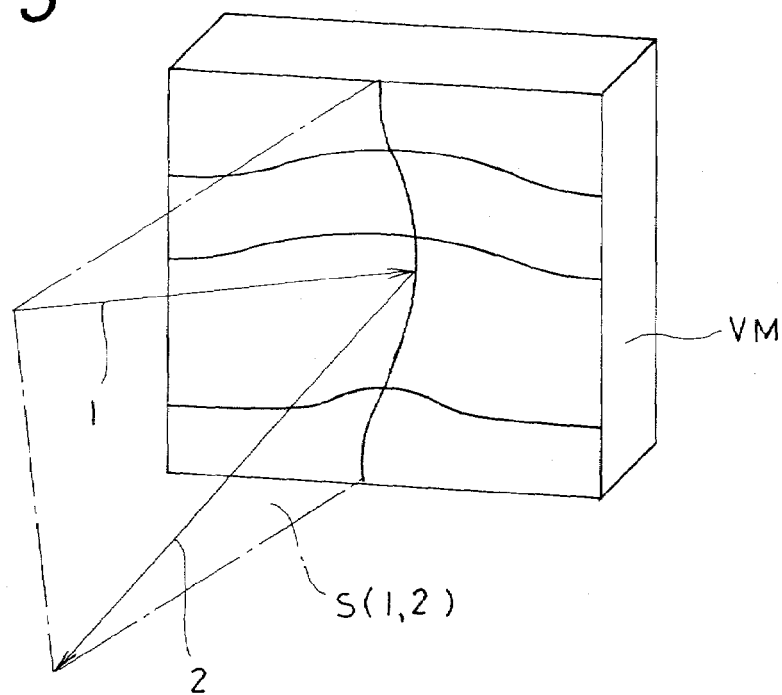
FIG. 5 is a diagram showing an example of a reflecting surface of a variable shape optical element.

FIG. 5 is a diagram showing a form of the mirror VM having the variable shape, which is symmetric with regard to a plane S(1, 2) which includes an optical axis 1 of a light bundle incident on the mirror VM having the variable shape and an optical axis 2 of the light bundle reflected by the mirror VM.

When the optical system is focused on an object located at an infinite distance, the mirror having the variable shape has a planar surface, but when the optical system is to be focused on an object located at a short distance, the shape of the mirror is varied so as to be an aspherical surface which is symmetric with regard to the plane S(1, 2) as shown in FIG. 5, thereby focusing the optical system on the object located at the short distance and correcting the eccentric aberrations.

The mirror having the variable shape therefore makes it possible not only to configure an image pickup apparatus compact as a whole but also allow the image pickup apparatus to correct aberrations and have favorable optical performance.

Figure 6A:
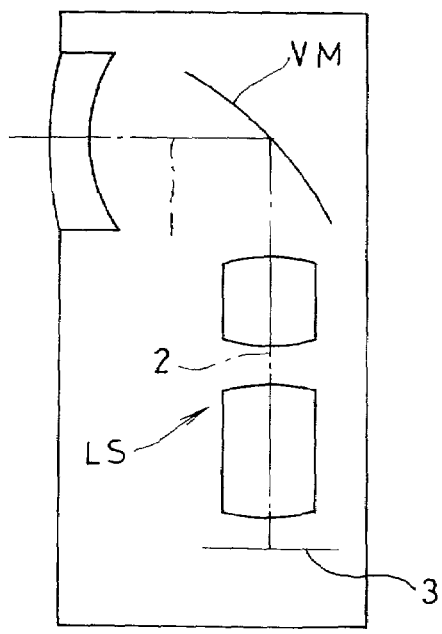
FIGS. 6A and 6B are diagrams showing a fifth embodiment of the present invention.
Figure 6B:
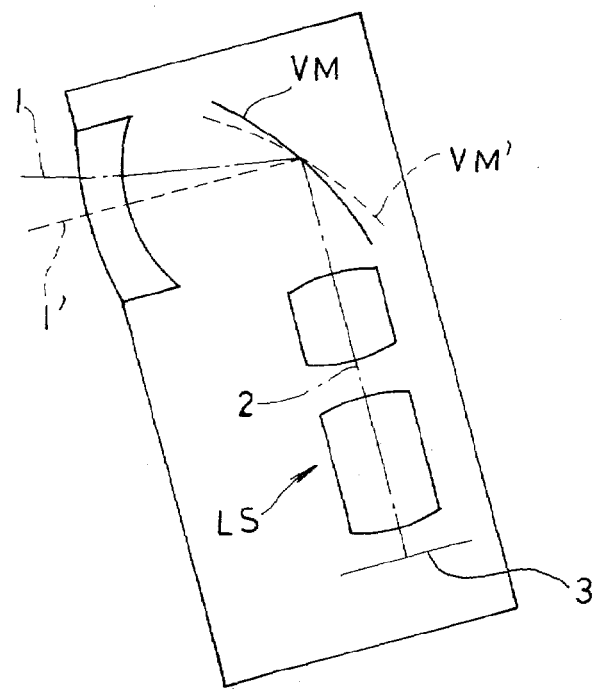

FIGS. 6A and 6B are diagrams showing means for preventing influences due to vibrations such as hand vibrations.

FIG. 6A shows an image pickup apparatus free from band vibrations, whereas FIG. 6B shows an image pickup apparatus in a condition where a hand vibration correcting function is effective.

When an image pickup apparatus is turned downward and an optical axis direction 1' of a photographic optical system LS is turned downward as shown in FIG. 6B, for example, from the condition free from the vibrations shown in FIG. 6A, a shape of the reflecting optical element VM having the variable shape is varied so that reflected rays travel in a direction of an optical axis 2 and an optical axis of rays incident on a CCD or image pickup means 3 such as a film is not inclined. In this case, it is preferable not only to vary the shape of the reflecting element VM having the variable shape for obtaining a function to prevent the optical axis from being inclined but also to correct the shape of the reflecting element VM having the variable shape as a whole so as suppress variations of aberrations.

Figure 7:
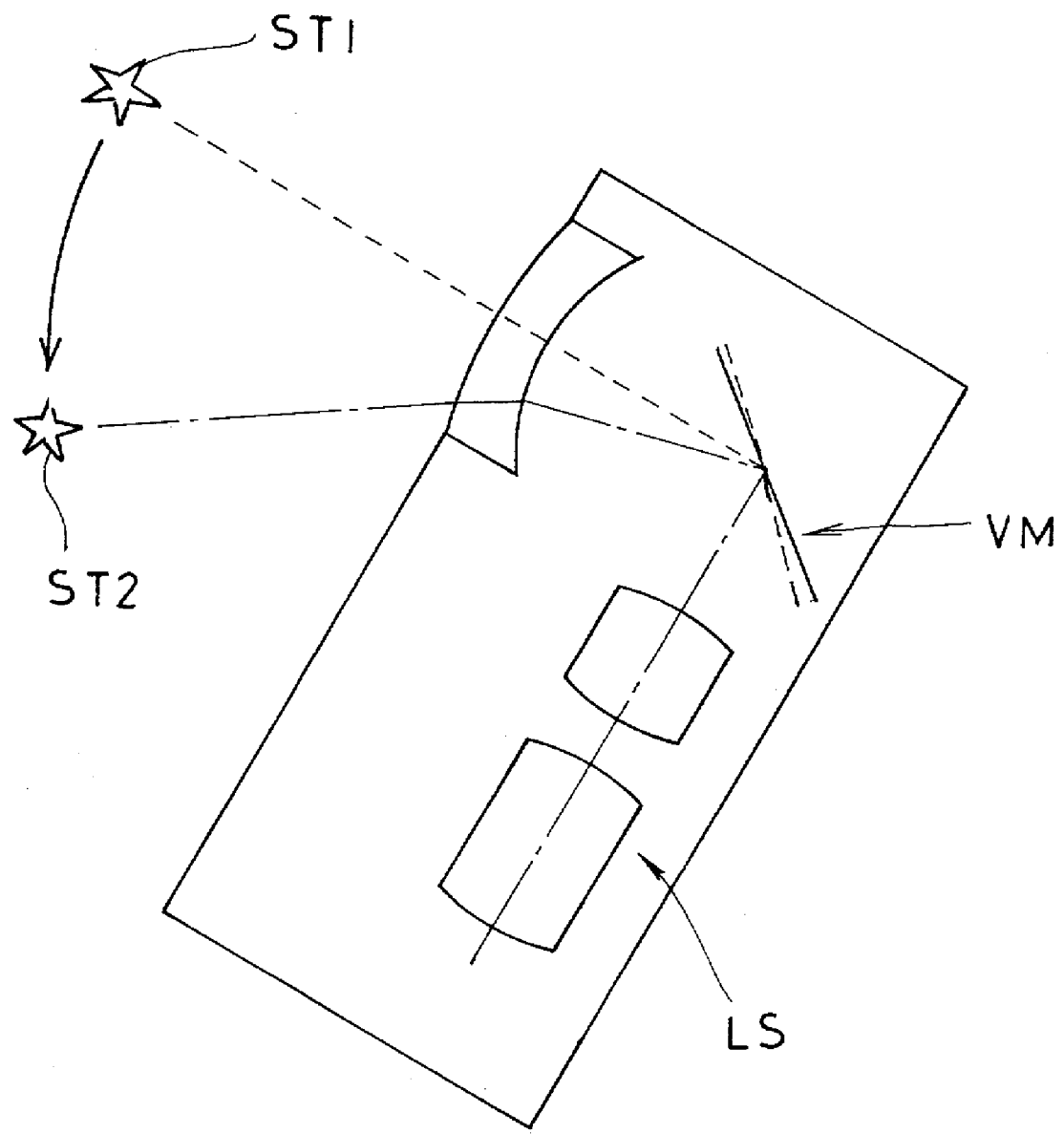
FIG. 7 is a diagram showing a sixth embodiment of the present invention.

FIG. 7 shows an example of image pickup apparatus which is configured to form an image always at an identical location on an image surface during exposure for a long time of a moving object such as a celestial body.

The image pickup apparatus is configured to vary a shape (curvature) of a variable shape mirror continuously as a moving object ST such as a celestial body moves from ST1 to ST2, thereby forming an object such as a star always at an identical location on an image surface during exposure for a long time.

Figure 8A:
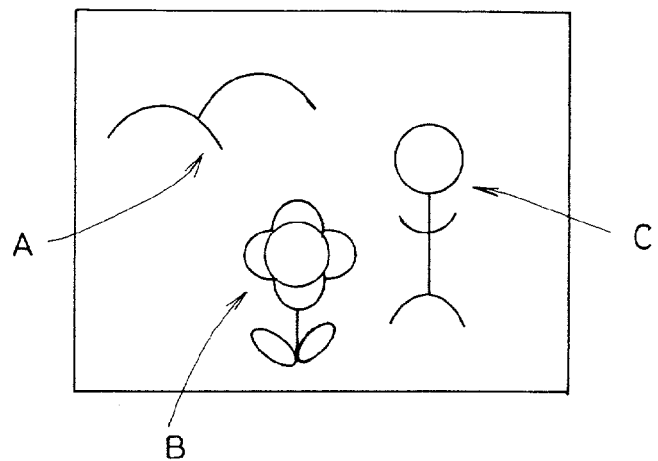
FIGS. 8A and 8B are diagrams showing a seventh embodiment of the present invention.
Figure 8B:
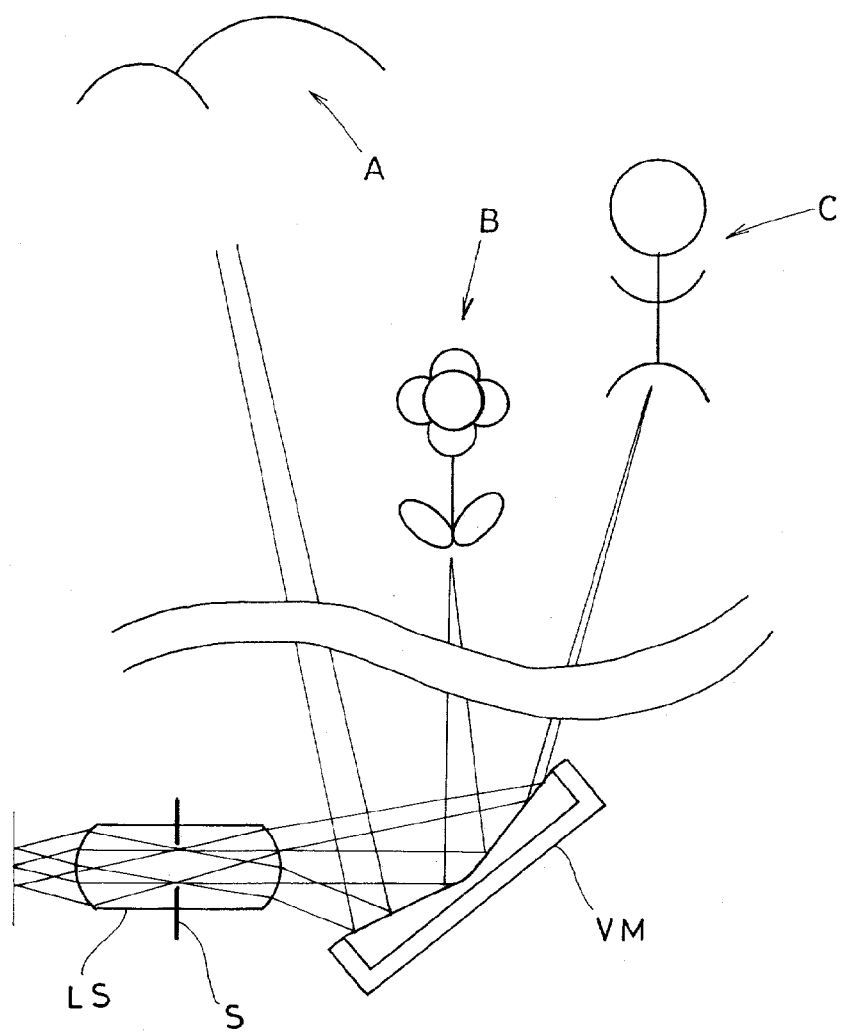

FIGS. 8A and 8B are diagrams showing an embodiment which performs range finding to points at different object distances and is focused on a best fit curved surface (where a sum of squares of distances to the points is minimum, for example).

Shown in FIGS. 8A and 8B is an example in which a shape of a mirror having a variable shape is varied so as to focus an photographic optical system nearly on an object located at a distance C intermediate between a view at a long distance A and an object located at a short distance B.

In FIG. 8A, power to be applied to light bundles is varied on the basis of an image formed by the view finder system dependently on the objects at the distances A, B and C selected by a viewing ray input device (not shown), and power applying portions of the mirror having the variable shape are configured to be varied with signals from a CPU.

Figure 9:
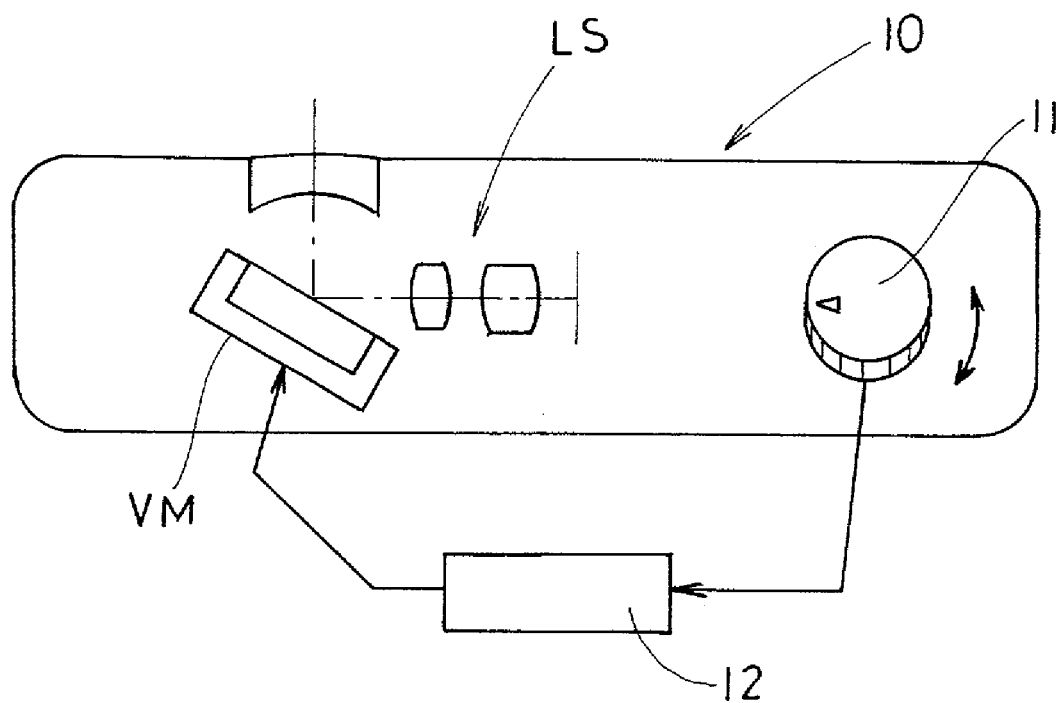
FIG. 9 is a diagram showing an eighth embodiment of the present invention.

FIG. 9 shows a ninth embodiment of the image pickup apparatus according to the present invention. This embodiment is an image pickup apparatus which comprises an optical system using a mirror having a variable shape and is configured to allow selection among various modes such as a normal photographic mode, a resolution emphasis mode, a distortion correcting mode and a soft focus mode.

An image pickup apparatus 10 has a dial 11 for selection among the above described modes and a shape of a mirror VM having a variable shape is varied into a shape in a mode directed by the dial 11 by way of a CPU 12 as shown in FIG. 9.

Figure 10A:
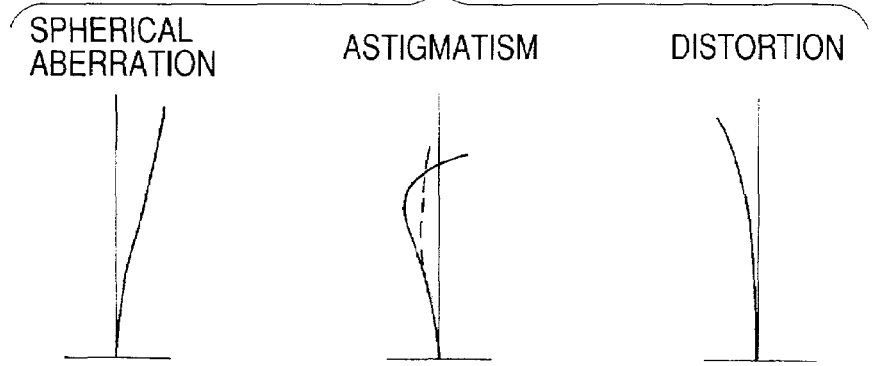
FIGS. 10A, 10B, 10C and 10D are curves visualizing an outline of aberrations in an image pickup apparatus according to the eighth embodiment.
Figure 10B:
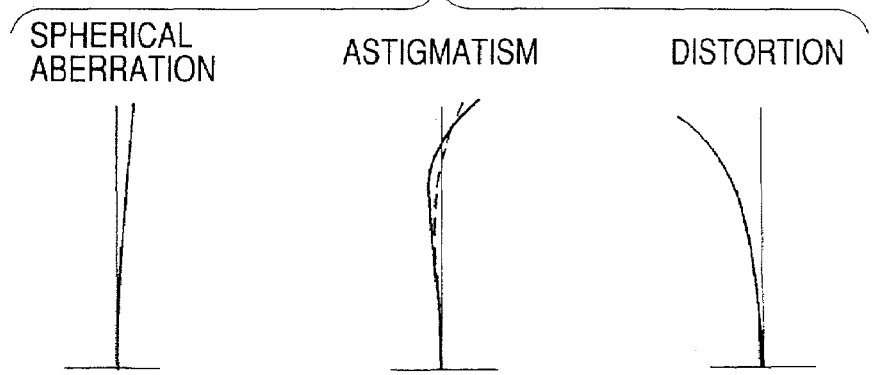
Figure 10C:
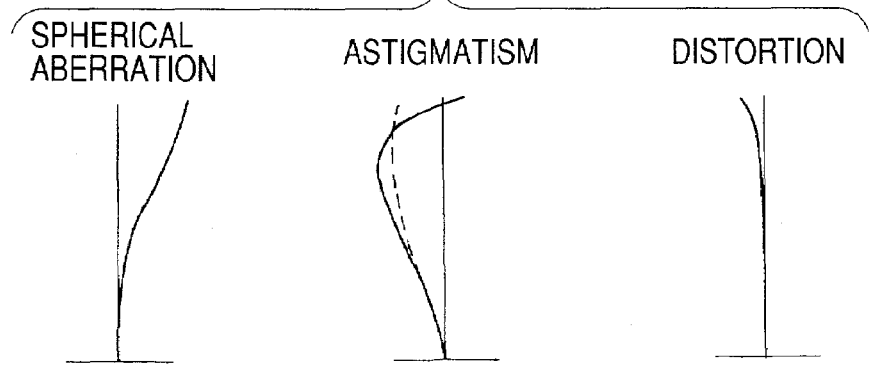
Figure 10D:
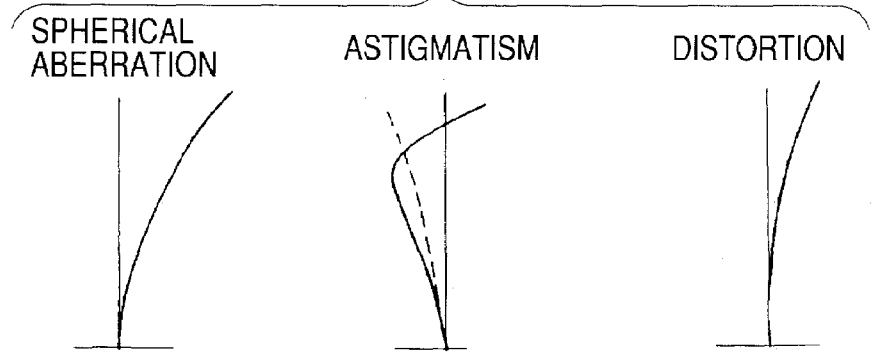

FIGS. 10A, 10B, 10C and 10D show aberration conditions obtained by varying a shape of a reflecting surface of the reflecting optical element VM having the variable shape in respective modes in the image pickup apparatus shown in the above described FIG. 9. Out of these drawings, FIG. 10A is the normal mode, FIG. 10B is the resolution emphasis mode, FIG. 10C is the distortion correcting mode and FIG. 10D is the soft focus mode. As shown conceptionally in these drawings, spherical aberration, astigmatism and distortion are corrected with good balance in the normal mode shown in FIG. 10A, spherical aberration is corrected favorably in particular in the resolution emphasis mode shown in FIG. 10B, distortion is corrected favorably in particular in the distortion correcting mode shown in FIG. 10C and spherical aberration is produced remarkably in the soft focus mode shown in FIG. 10D.

The image pickup apparatus having a composition shown in FIG. 9 is configured to vary the shape of the reflecting optical element VM having the variable shape so as to obtain the above described aberration conditions in an optical system and permit photographing desired images.

Figure 11A:
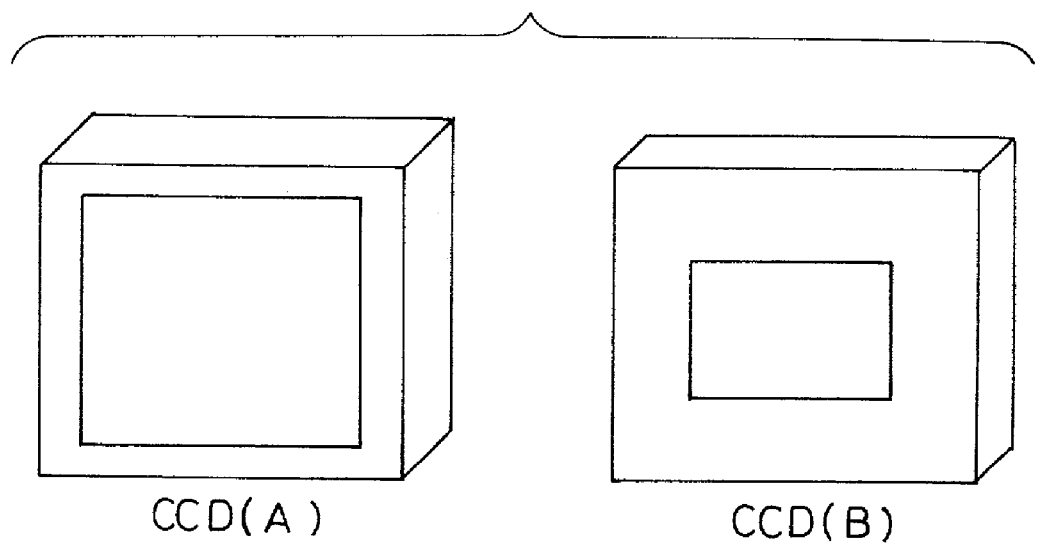
FIGS. 11A and 11B are diagrams showing a ninth embodiment of the present invention.
Figure 11B:
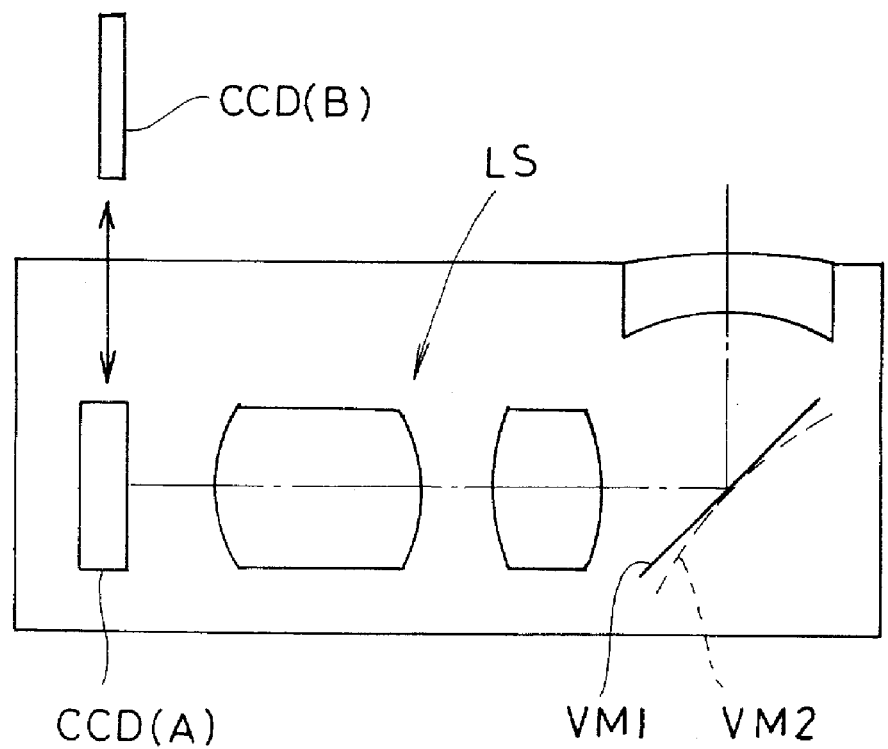

FIGS. 11A and 11B shows a tenth embodiment of the image pickup apparatus according to the present invention.

This embodiment is an example of image pickup apparatus which is configured so as to be capable of corresponding to image pickup devices CCD(A) and CCD(B) which have different numbers of picture elements. In other words, CCD(A) has a diagonal length of an image pickup surface which is longer than that of CCD(B). The tenth embodiment permits selection between the image pickup devices CCD(A) and CCD(B) to be disposed on an image pickup surface of an image pickup optical system as described above. However, a photographic field angle is changed dependently on the diagonal lengths of the image pickup surfaces when the image pickup devices are simply replaced with each other.

The image pickup apparatus according to the tenth embodiment reduces a difference between the field angles by varying a surface shape of a reflecting optical element having a variable shape as indicated by a solid line and a dashed line as shown in FIG. 11B when the image pickup device is replaced with the other. Specifically, the difference between variations of the field angles is reduced by varying the surface shape of the reflecting optical element having the variable shape so as to be a planar surface as shown as a variable shape reflecting optical element VM1 when CCD (A) is to be used or a convex surface as shown as a variable shape reflecting optical element VM2 when CCD(B) is to be used.

Figure 12A:
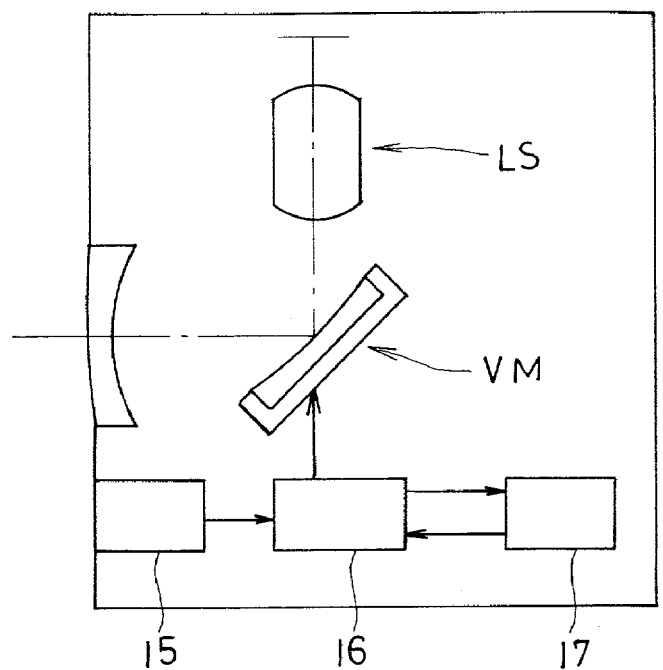
FIGS. 12A, 12B and 12C are diagrams showing a tenth embodiment of the present invention.
Figure 12B:
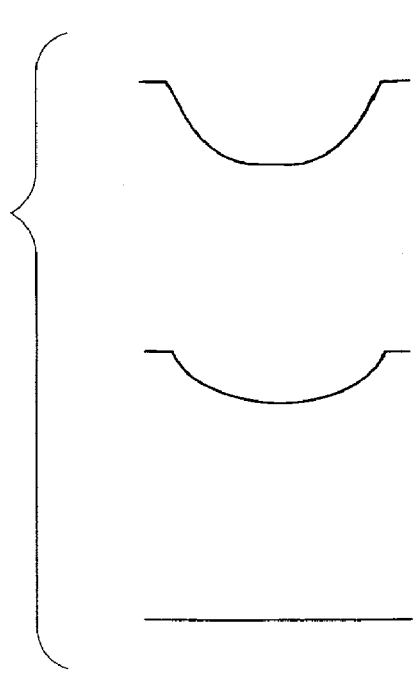
Figure 12C:
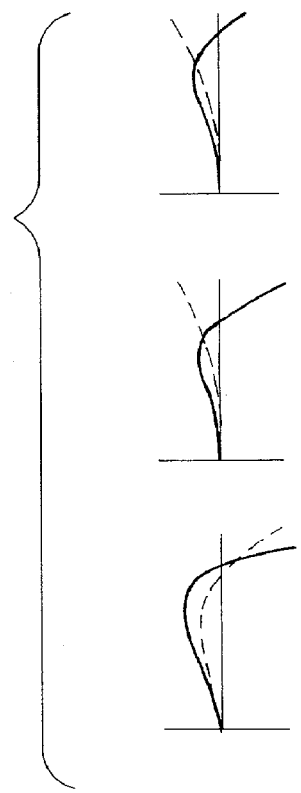

FIGS. 12A, 12B and 12C are diagrams showing an eleventh embodiment of the image pickup apparatus according to the present invention.

The eleventh embodiment is an example of image pickup apparatus which is configured to focus a photographic optical system by varying a shape of a reflecting optical element VM having a variable shape on the basis of a signal obtained by a measurement with an automatic focusing mechanism.

An image pickup apparatus according to the eleventh embodiment is shown in FIG. 12A, in which a reference symbol LS represents an image pickup optical system, a reference symbol VM designates a variable shape mirror, a reference numeral 15 denotes an automatic focusing mechanism, a reference numeral 16 represents a CPU and a reference numeral 17 designates a memory. An optimum shape of the mirror having the variable shape is calculated by sending a signal obtained by a light measurement with the automatic focusing mechanism to the CPU 16 as shown in FIG. 12A, an object distance is calculated with this signal and calling out data stored in the memory. A signal which controls the mirror VM having the variable shape so as to have the calculated shape is transmitted from the CPU 16, thereby varying a surface shape of the mirror VM having the variable shape and focusing the image pickup optical system.

FIGS. 12B and 12C show shapes of the reflecting optical element VM having the variable shape (FIG. 12B) and curvature of field (astigmatism) which correspond to distances to objects (FIG. 12C) which are calculated on the basis of light measurements with the image pickup apparatus shown in FIG. 12A. In these drawings, a shape of a reflecting surface and aberration conditions in a condition focused on an object located at 50 cm are shown at an upper stage, a shape of the reflecting surface and aberration conditions in a condition focused on an object located at 1 m are shown at a middle stage, and a shape of the reflecting surface and aberration conditions in a condition focused on an object located at an infinite distance are shown at a lower stage.

Figure 13:
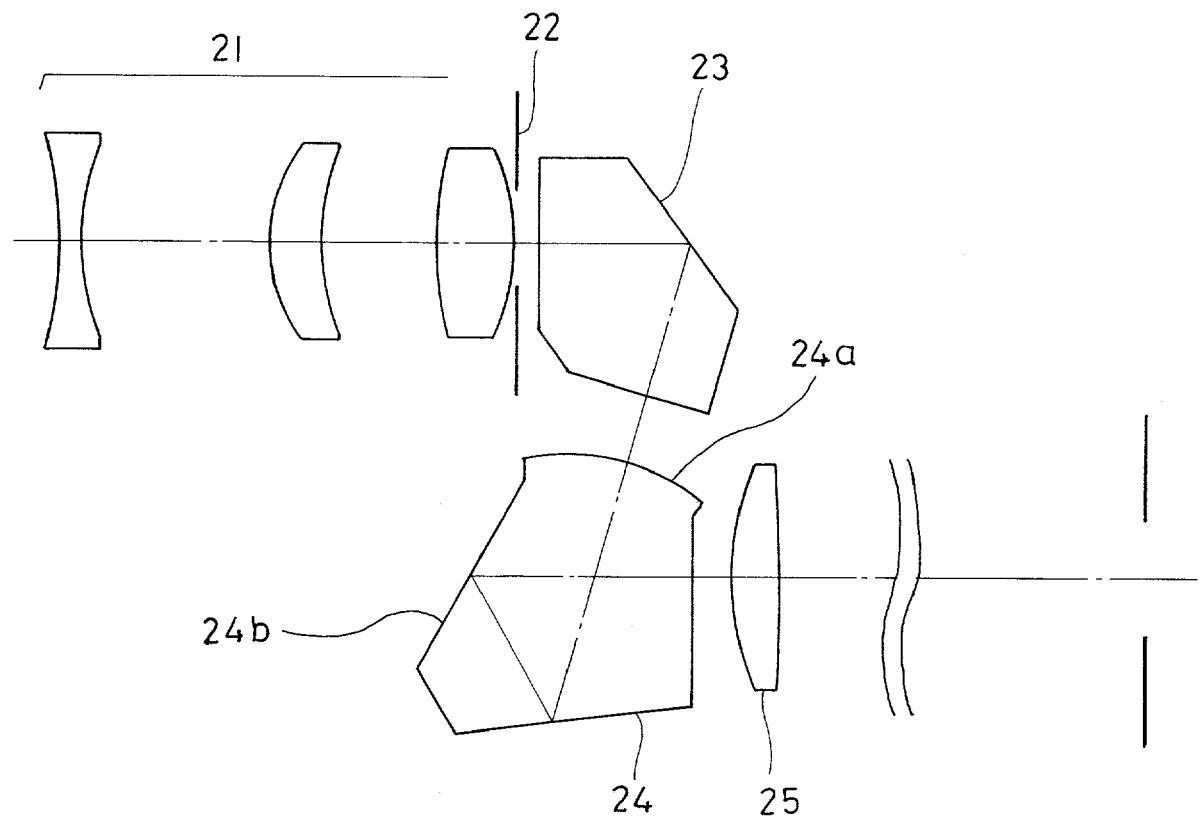
FIG. 13 is a diagram showing a configuration of a view finder according to an eleventh embodiment of the present invention.

FIG. 13 shows an embodiment comprising a Keplerian view finder which has the fourth composition according to the present invention or an example where one of image erecting reflecting surfaces is configured as a variable shape mirror.

In FIG. 13, a reference numeral 21 represents an objective lens system which consists of a negative lens element and positive lens elements, a reference numeral 22 designates a visual field frame which is disposed at a location of an intermediate image surface, a reference numeral 23 denotes a roof prism, a reference numeral 24 represents a pentagonal prism which has a convex surface of incidence 24a and a role of a condenser lens, and a reference numeral 25 designates an eyepiece optical system consisting of an eyepiece.

In this embodiment, a surface 24b which is a second reflecting surface of the pentagonal prism 24 is configured as a mirror having a variable shape which is varied to adjust diopter for zooming, photographing an object located at a short distance, and correcting a vergence angle between the prism 24 and a photographic lens system which is not shown in FIG. 13. Furthermore, it is possible to vary the shape of the surface for correcting a vergence angle so as to match with a near-sighted eye, a far sighted eye and an astigmatic eye of observers.

Furthermore, a view finder shown in the drawing is configured to change a visual field for observation by moving a plurality of lens elements out of lens units (elements) composing the objective lens system 21.

Figure 14:
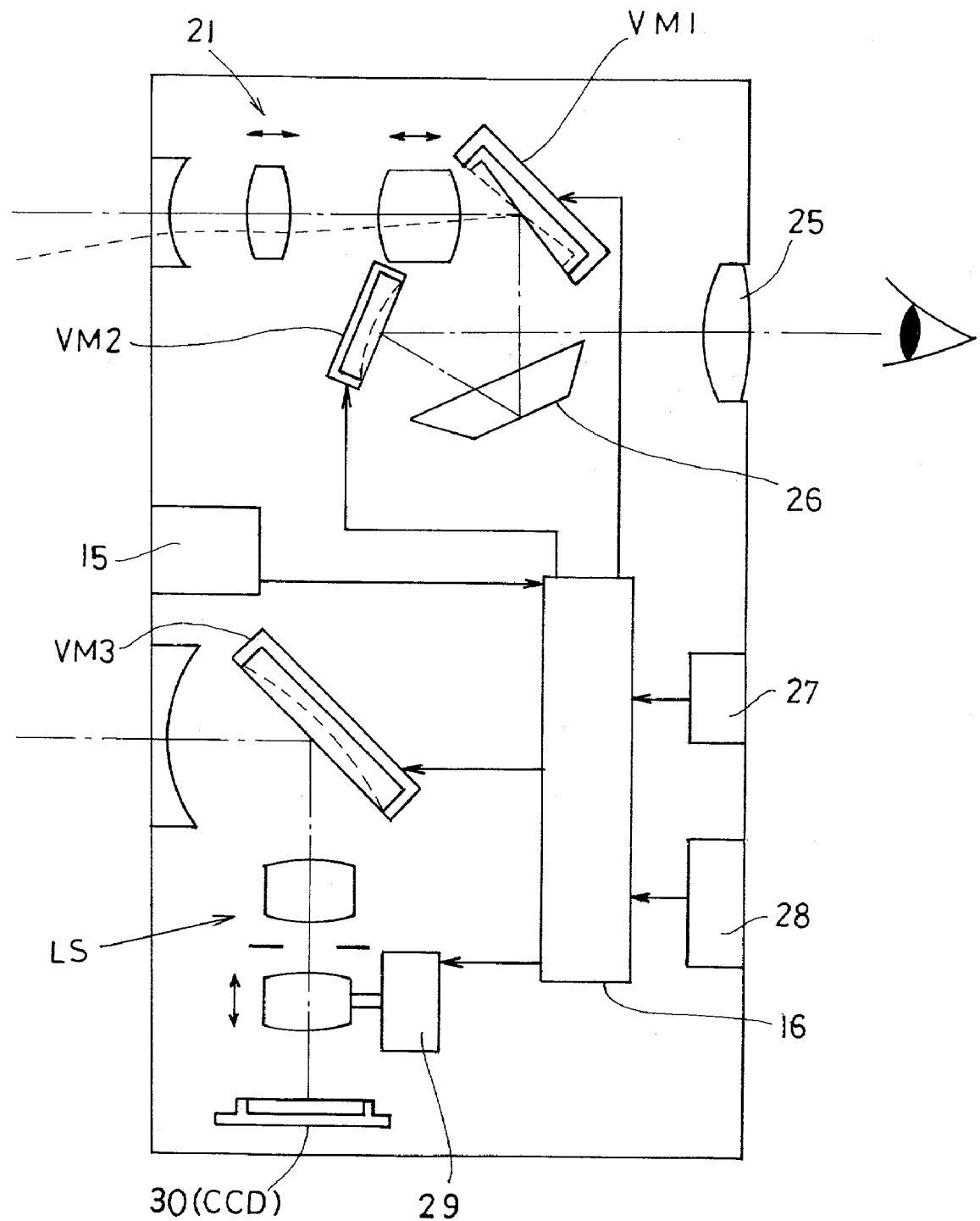
FIGS. 14 and 15 are diagrams showing twelfth and thirteenth embodiments of the present invention.

FIG. 14 shows an embodiment of an image pickup apparatus comprising a view finder having another composition in which a mirror having a variable shape is used as a reflecting surface in a view finder which is similar to the view finder having the above described composition.

In FIG. 14, a reference numeral 21 represents an objective lens system, reference symbols VM1 and VM2 designate mirrors having variable shapes respectively, a reference numeral 26 denotes a roof mirror and a reference numeral 25 represents an eyepiece optical system; these components composing a view finder, for example, such as that shown in FIG. 13. Furthermore, the two mirrors VM1 and VM2 having the variable shapes are disposed in the view finder. Furthermore, a reference numeral 15 represents an automatic focusing mechanism, a reference numeral 16 designates a CPU, a reference symbol LS denotes a photographic lens system, for example, such as that shown in FIG. 1, 2, 3 or 4, a reference numeral 27 represents a release button, a reference numeral 28 designates a zoom switch, a reference numeral 29 denotes a driving system for moving lens units for changing a magnification of the photographic lens system (zoom lens system) LS and a reference numeral 30 represents an image pickup device.

This image pickup apparatus performs a calculation with the CPU 16 according to an instruction from the zoom switch 28, for example, and moves the lens units of the photographic lens system along an optical axis with the driving system 29 so as to set a magnification at an instructed level. Simultaneously, shapes of the mirrors having the variable shapes are varied with a signal from the CPU 16 to correct a deviation of an image surface caused due to a magnification change which is effected by moving the lens units with the driving system 29.

Furthermore, the objective lens system 21 of the view finder consists, in order from the object side, of a negative lens unit, a positive lens unit and a positive lens unit, for example, as shown in FIG. 12A, and is configured to obtain a visual field for observation corresponding to a photographing field angle by moving a plurality of lens units out of the three lens units. Furthermore, the mirror VM2 on a side of the eyepiece system 25 out of the variable shape mirrors VM1 and VM2 may be utilized for adjusting diopter so as to match it with diopter of an observer's eye.

Furthermore, the release button 27 inputs a signal from the automatic focusing mechanism into the CPU 16, the CPU 16 calculates a photographing object distance on the basis of this signal and calculated data is sent to a mirror VM3 having a variable shape of the photographic lens system LS to vary a shape of a reflecting surface, thereby performing focusing.

On the other hand, a view finder system is configured to vary a shape of the mirror VM1 having the variable shape on a side of the objective lens system 21 in order to correct parallax between the view finder system and a photographing range on the basis of the photographing object distance and a signal representing a zoom condition of the photographic lens system. Simultaneously, the view finder system varies a shape of the mirror VM2 having the variable shape on a side of the eyepiece system so as to match diopter between a focused object point and a visual field frame.

Out of the shapes of the three mirrors VM1, VM2 and VM3 having the variable shapes, those which are traced in solid lines are surface shapes in a condition where the photographic lens system is focused on an object located at an infinite distance, whereas those which are traced in dashed lines designate surface shapes in a condition where the photographic lens system is focused on an object located at a short distance.

The image pickup apparatus according to this embodiment is capable of correcting parallax and diopter for the photographing range easily as described above.

FIGS. 15, 16A, 16B, 16C, 17A, 17B, 17C, 18A, 18B, 18C, 19A, 19B and 19C show an embodiment of an image pickup apparatus which is configured to determine an exposure time at a stage to photograph an object by measuring light amounts at locations within a photographing range of the object and calculating a weighted mean.

Figure 15:
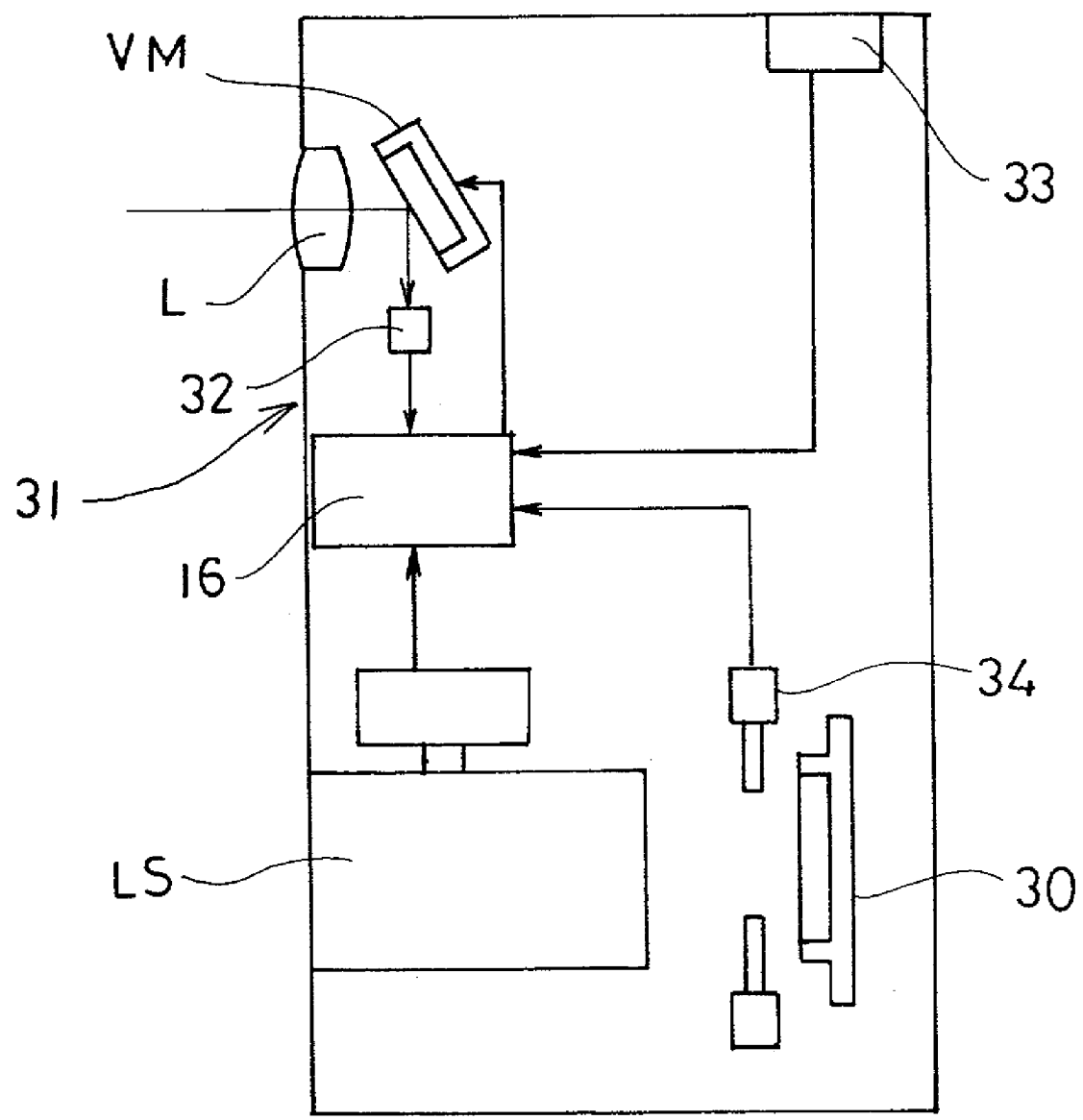

In FIG. 15, a reference symbol LS represents a photographic optical system, for example, such as that shown in any one of FIGS. 1 to 4 which is a zoom lens system for forming an image on a light receiving surface of image recording means such as an image pickup device, CCD or a film, and a signal indicating a zoom condition of the photographic optical system is input into a CPU 16. Furthermore, a reference numeral 31 designates a light measuring system which consists, in order from the object aside, of a positive lens component L, a mirror VM having a variable shape and a light measuring element 32. Though the shown light measuring element 32 has a single small light receiving surface, a light measuring element may have a single light receiving surface or a plurality of light receiving surfaces which are patterned.

In an image pickup apparatus according to the embodiment shown in FIG. 15, rays which are incident on the positive lens component 1, and reflected by the mirror VM having the variable shape are measured by the light measuring element 32 and measured data is input into the CPU 16. Furthermore, a reference numeral 33 represents a light measuring mode selecting mechanism which inputs a signal indicating a selected mode into the CPU 16 upon selection of a specific mode. Furthermore, a reference numeral 34 designates a trimming control mechanism which has a function to permit modifying a photographing range when the image recording means 30 is an image pickup device or a visual field stop for determining an image pickup range is disposed right before an image surface when the image recording means 30 is a film surface.

In the image pickup apparatus according to this embodiment, the shape of the mirror VM having the variable shape of the light measuring system 31 which is disposed on a front surface of the apparatus is varied into a surface shape calculated by the CPU 16 based on a zoom condition of the photographic optical system LS and a light measuring mode selected by the light measuring mode selecting mechanism.

The above described light measuring mode is selectable, for example, out of a center weighted light measurement, a center spot light measurement mode and a center weighted mean light measurement mode.

FIGS. 16A, 16B, 16C, 17A, 17B and 17C variations of a surface shape (FIGS. 16A, 16B and 16C) and distribution of light amounts.(FIGS. 17A, 17B and 17C) in the light measuring modes selected in the image pickup apparatus shown in FIG. 15.

Figure 16A:
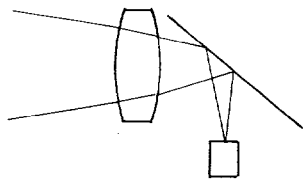
FIGS. 16A, 16B and 16C are diagrams showing variations of a shape of a reflecting optical element having a variable shape in an image pickup apparatus according to the thirteenth embodiment.
Figure 17A:
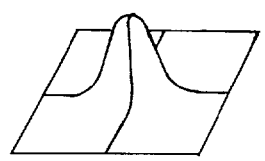
FIGS. 17A, 17B and 17C are diagrams showing light amount distributions in conditions shown in FIGS. 16A, 16B and 16C respectively.

FIG. 16A shows a shape of the mirror VM having the variable shape when the center spot light measurement mode is selected by the light measuring mode selecting mechanism 33 and a distribution of light amounts in this mode is shown in FIG. 17A.

Figure 16B:
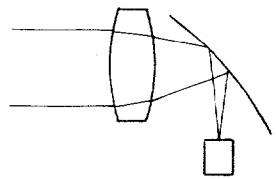
Figure 17B:
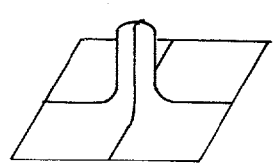

Furthermore, FIG. 16B shows a shape of the mirror VM having the variable shape when the center spot measurement is selected and a distribution of light amounts in this mode is shown in FIG. 17B.

Figure 16C:
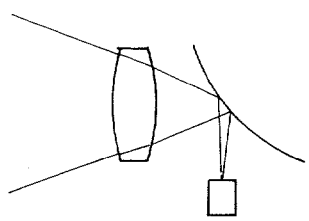
Figure 17C:

Furthermore, FIG. 16C shows a shape of the mirror having the variable shape when the center weighted mean light measurement mode is selected and a distribution of light amounts in this mode is shown in FIG. 17C.

Figure 18A:
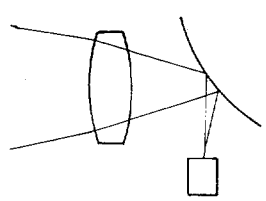
FIGS. 18A, 18B and 18C are diagrams showing variations of the shape of the reflecting optical element having the variable shape in zoom conditions of the image pickup apparatus according to the thirteenth embodiment.
Figure 18B:
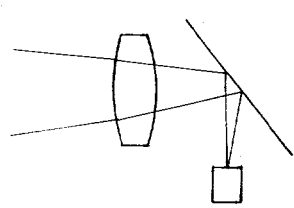
Figure 18C:
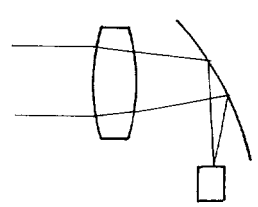

Furthermore, FIGS. 18A, 18B and 18C show operations for modifying light measuring ranges dependently on zoom conditions of an image pickup system (the photographic lens system): FIG. 18A showing a shape of a reflecting surface at a wide position of the image pickup system, FIG. 18B showing a shape of the reflecting surface at an intermediate focal length of the image pickup system and FIG. 18C showing a shape of the reflecting surface at a tele position of the image pickup system.

In the center weighted light measurement mode, the shape of the reflecting surface is convex in a zoom condition on a wide position side of the intermediate focal length or concave in a zoom condition on a tele position side of the intermediate focal length as shown in FIGS. 18A, 18B and 18C. Accordingly, the image pickup apparatus is capable of modifying the light measuring range as a photographing range changes.

Figures 19A, 19B, 19C:
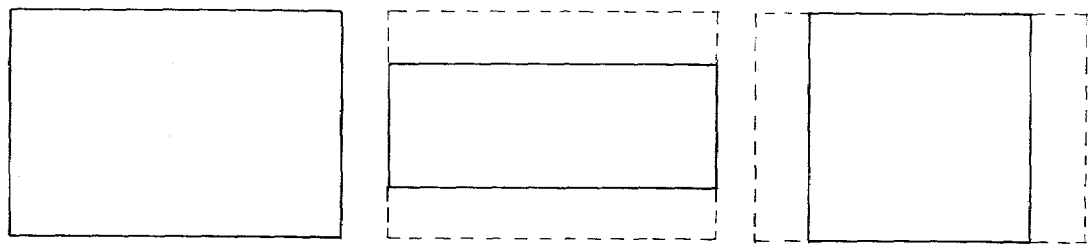
FIGS. 19A, 19B and 19C are diagrams showing trimmed conditions of an image pickup surface of the image pickup apparatus according to the thirteenth embodiment.
Figures 20A, 20B, 20C:
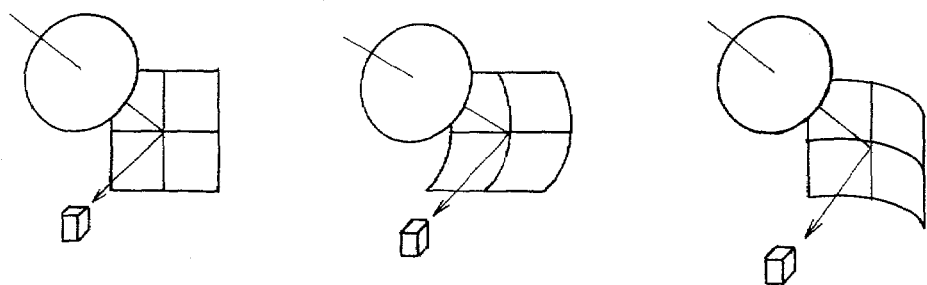
FIGS. 20A, 20B and 20C are diagrams showing shapes of the reflecting surface of the reflecting optical element having the variable shape corresponding to the trimmed conditions shown in FIGS. 19A, 19B and 19C.

FIGS. 19A, 19B, 19C, 20A, 20B and 20C show operations for modifying the light measuring range dependently on image pickup surfaces and trimming conditions in the image pickup apparatus having the composition shown in FIG. 15. FIG. 19A shows a trimming condition in a high vision mode in which the photographing range is maximum, FIG. 19B shows a trimming condition in a panoramic mode in which a vertical size is shortened and FIG. 19C shows a trimming condition in a classic mode in which a horizontal size is shortened. FIGS. 20A, 20B and 20C show shapes of the mirror VM having the variable shape which are different dependently on the modes shown in FIGS. 19A, 19B and 19C.

The mirror VM having the variable shape has a planar shape (basic shape) in the high vision mode as shown in FIG. 20A, a cylindrical shape convex in a vertical direction in the panoramic mode for shortening a vertical size of the light measuring range as shown in FIG. 20B or a cylindrical shape convex in a horizontal direction in the classic mode for shortening a horizontal size of the light measuring range. The image pickup apparatus is capable of modifying the light measuring range dependently on photographing conditions as described above.

Figure 21A:
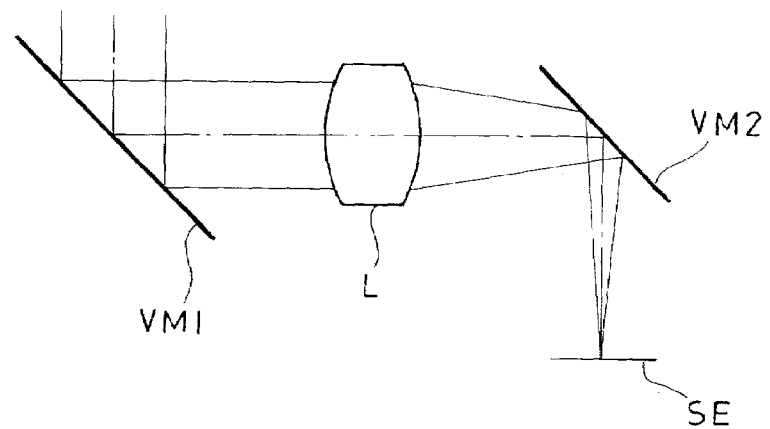
FIGS. 21A, 21B, 21C and 21D are diagrams showing a fourteenth embodiment of the present invention.
Figure 21B:
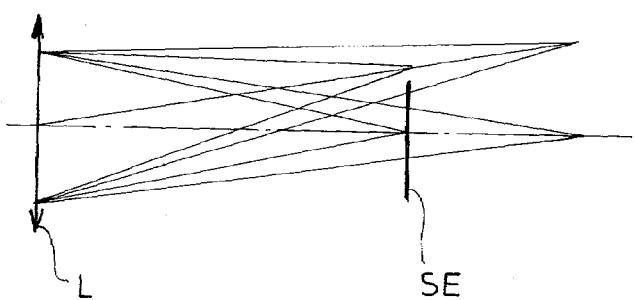
Figure 21C:
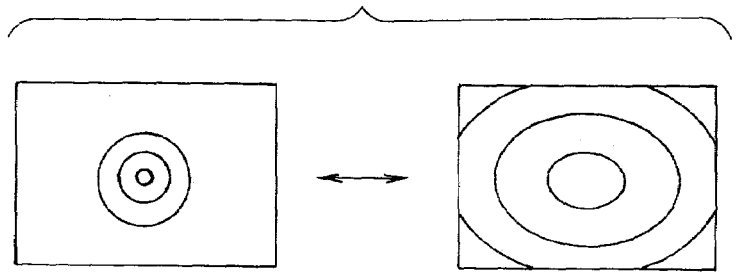

FIGS. 21A, 21B, 21C and 21D show an embodiment in which a light receiving surface of a light measuring sensor SF has an area of a certain degree relative to an image pickup range. FIG. 21A shows a composition of this embodiment in which mirrors VM1 and VM2 having variable shapes are disposed on both sides of a lens component L as shown in the drawing. FIG. 21B is a diagram showing a ray condensing condition in the embodiment shown in FIG. 21A when it is configured to change a degree of gradation on the light measuring sensor by changing a surface shape of the mirror VM2 having the variable shape on a side of the sensor. FIG. 21C shows a variation of a light measuring pattern in the ray condensing condition shown in FIG. 21B and the embodiment is capable of measuring light in various modes as shown in FIG. 21C.

Figure 21D:
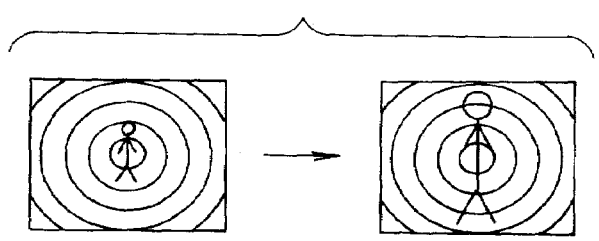

Though a photographing range is changed by zooming a photographic lens system, the embodiment varies the shapes of the mirrors VM1 and VM2 having the variable shapes of the light measuring system shown in FIG. 21A, thereby being capable of changing an image magnification on the light measuring sensor as shown in FIG. 21D without changing a light measuring pattern and maintaining a light measurement mode desired by a photographer.

Figure 22A:
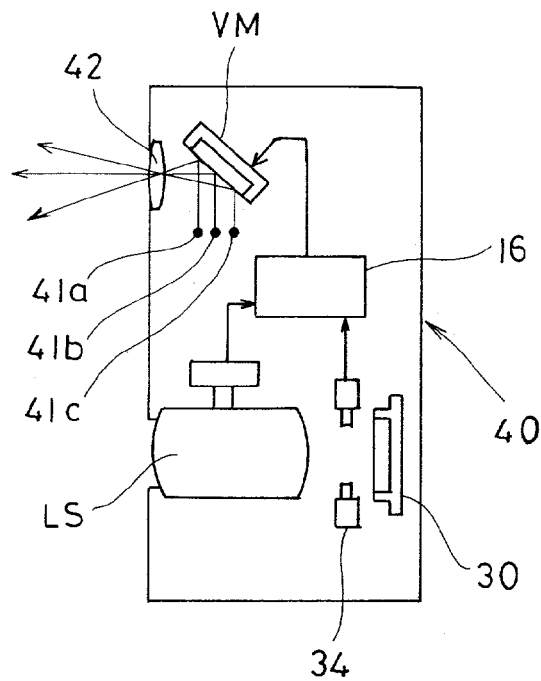
FIGS. 22A, 22B and 22C are diagrams showing a fifteenth embodiment of the present invention.
Figure 22B:
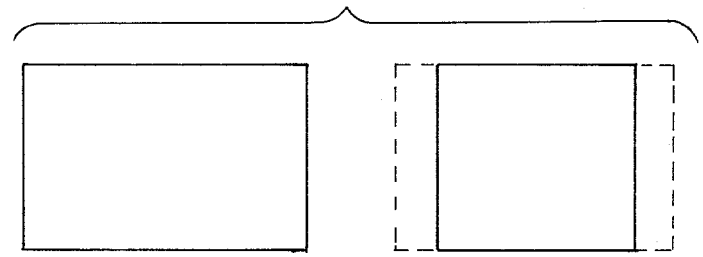
Figure 22C:
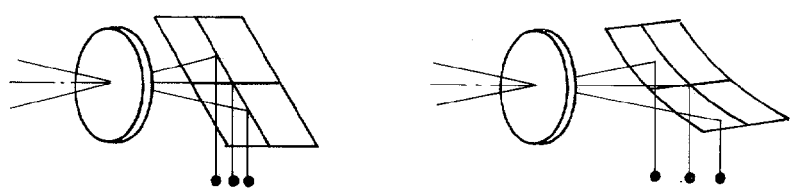

FIGS. 22A, 22B and 22C show an embodiment of an image pickup apparatus which comprises a photographing system for picking up an image of an object and a range finding system for measuring a distance at an image pickup stage.

In FIG. 22A, a reference symbol LS represents a zoom lens system which is a photographic lens system, reference numerals 41a, 41b and 41c designate light emitting elements, a reference numeral 42 denotes a light projector lens component, a reference numeral 40 represents a range finding system consisting of a mirror having a variable shape or the like, and a reference numeral 34 designates a trimming mechanism.

In this image pickup apparatus, information such as a magnification is sent from the photographic lens system LS to a CPU 16, information of the trimming mechanism 34 is input into the CPU 16 and a shape of the mirror VM having the variable shape is varied based on the information in the CPU 16. Accordingly, rays from the light emitting elements 41a, 41b and 41c are projected through the light projector lens component 42 to an object after the rays are reflected by the mirror VM having the variable shape.

FIG. 22B shows a trimming condition and FIG. 22C shows a variation of a shape of the mirror VM having the variable shape in the trimming condition.

As shown in these drawings, the mirror VM having the variable shape has a planar surface shape for a usual screen size, whereas the mirror VM having the variable shape has a convex cylindrical surface having curvature in a vertical direction when a screen is trimmed as shown on a right side in FIG. 22B.

Figure 23:
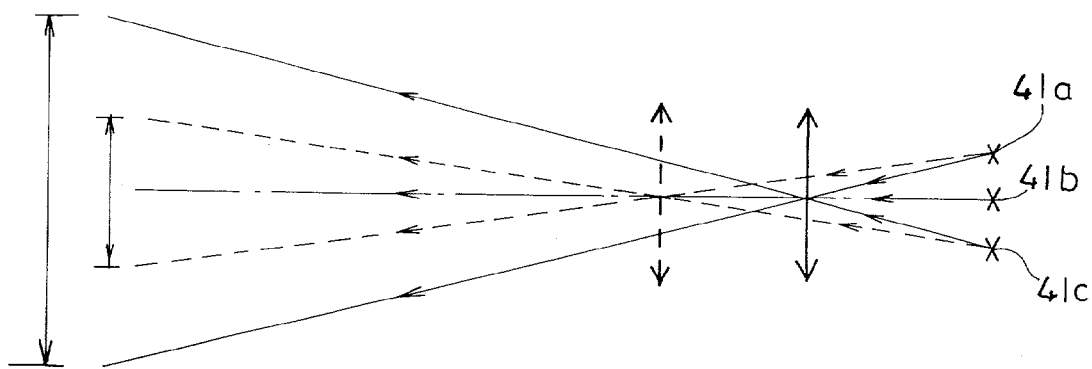
FIG. 23 is a diagram showing a light projecting condition by a light projector optical system in the fifteenth embodiment of the present invention.

FIG. 23 shows an example where a light projecting range of the three light sources 41a, 41b and 41c is changed as the photographic lens system LS is zoomed in the image pickup apparatus shown in FIG. 22A. In FIG. 23, a light projecting direction (direction toward an object) is identical to that in FIG. 22A, and the light sources 41a, 41b and 41c are shown on a right side. Furthermore, the mirror VM having the variable shape is omitted in FIG. 23.

Rays from the three light sources are varied as shown in FIG. 23 by varying the shape of the mirror VM having the variable shape, thereby making it possible to change a photographing range at a wide position from a photographing range at a tele position.

Figure 24A:
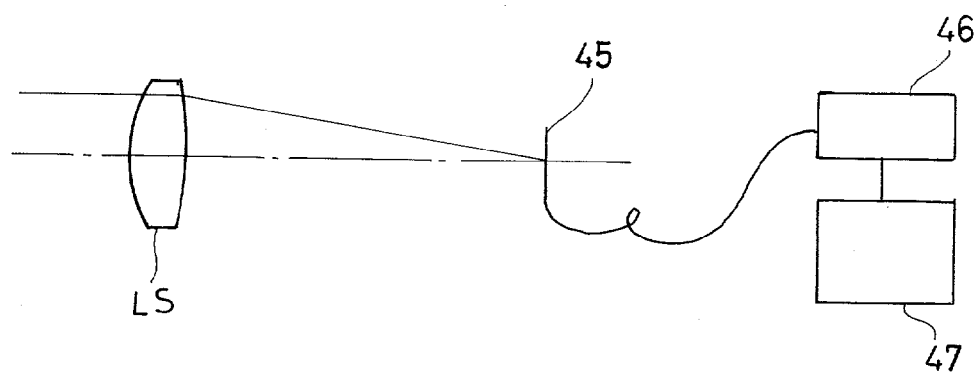
FIG. 24A, 24B and 24C are diagrams showing a sixteenth embodiment of the present invention.
Figure 24B:
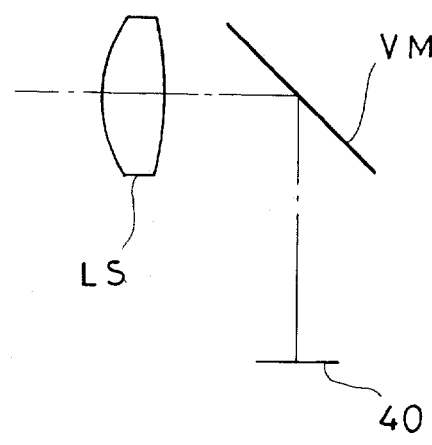
Figure 24C:
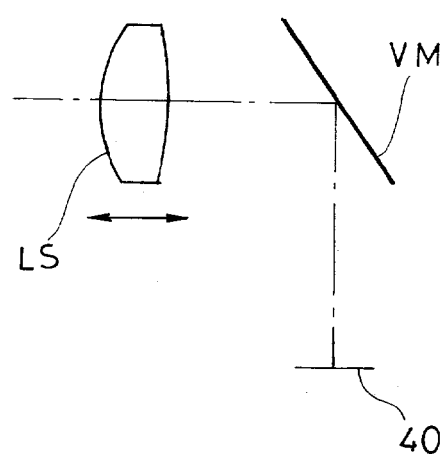

FIGS. 24A, 24B and 24C show an embodiment of an image pickup apparatus which is capable of picking up at a high speed a plurality of images which have different focused locations.

FIG. 24A and FIG. 24B show a configuration of the above described image pickup apparatus, which consists of a photographic lens system LS, a mirror VM having a variable shape, an image sensor 45, a memory 46, an image processing device 47 and the like.

This image pickup apparatus is configured to keep stationary a refractive optical element of the photographic lens system LS and vary the shape of the mirror VM having the variable shape in the lens system at a high speed in response to shutter release so as to focus the lens system on a plurality of points. Furthermore, the image sensor 45 which is a CCD or the like records images of the points in focused conditions and inputs the images into the memory 46. Based on the images stored in the memory 46, the image pickup apparatus is capable of performing a processing to compose an image having an optional apparent depth with the image processing device 47.

Furthermore, the fixed lens system LS shown in FIG. 24B may be replaced with a movable lens system as shown in FIG. 24C when the image pickup apparatus is to pickup only an image.

Figure 25:
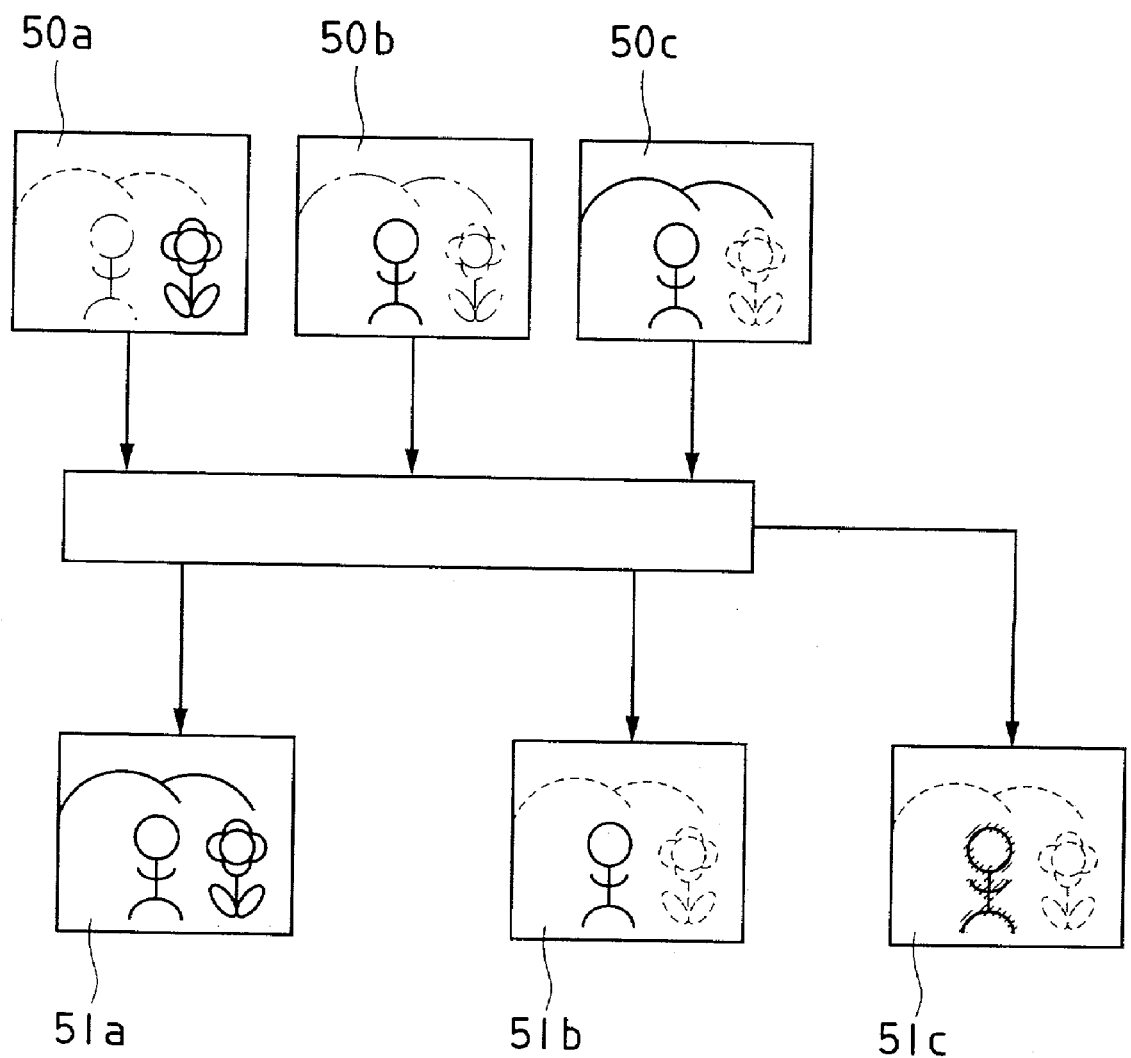
FIG. 25 is a diagram descriptive of an image processing by the image pickup apparatus according to the sixteenth embodiment of the present invention.

FIG. 25 shows an image processing by the image pickup apparatus which has the configuration shown in FIG. 24A. FIG. 25 shows an example to process three images: 50*a* at a short distance, 50*b* at an intermediate distance and 50*c* at a far distance. On these images 50*a*, 50*b* and 50*c*, solid lines represent sharply focused portions, chain lines designate slightly defocused portions and dashed lines denote vignetted portions.

Signals of these images 50*a*, 50*b* and 50*c* are input into the image processing device 47 for image processing.

By this image processing, the image pickup apparatus is capable of outputting an image 51*a* having a pan-focus effect, an image 51*b* having a vignetted effect and an image 51*c* in soft focus.

By extracting and composing only portions having high contrast from the images 50*a*, 50*b* and 50*c*, the image pickup apparatus is capable of providing a clear image like the image 51*a* shown as a conceptional image which is in good focus from a near scene to a far scene. In other words, the image pickup apparatus is capable of providing an image which has the pan focus effect.

In other to obtain an image having the above described effect by ordinary photographing, it is necessary to expose a film for a long time in a stop down condition, but an image may be blurred when an object moves.

In contrast, the image pickup apparatus according to this embodiment does not require stopping down and is therefore capable of providing an image in pan focus through the image processing even the image pickup apparatus is held by hand during photographing.

Furthermore, it is possible to obtain an image having such a vignetted effect as to emboss a main object by adopting a main object in focus and most vignetted images before and after the main objects from the above described images 51*a*, 51*b* and 51*c*. This vignetted effect is convenient for emphasizing a main object as in photographing a person or the like.

For a digital camera or a video camera which uses an image sensor, there lies a limit in shallowing a depth of field for configuring an image sensor an optical system compact. An image processing such as that by the image pickup apparatus shown in FIGS. 24A, 24B and 24C makes it possible to compose an image having a depth of field shallower than one beyond performance of a camera.

Furthermore, the image pickup apparatus is capable of providing an image like the image 51*c* which has a soft focus effect giving a soft impression like the image 51*c* by adopting portions in focus and vignetted portions at the same time to compose an image.

Figure 26A:
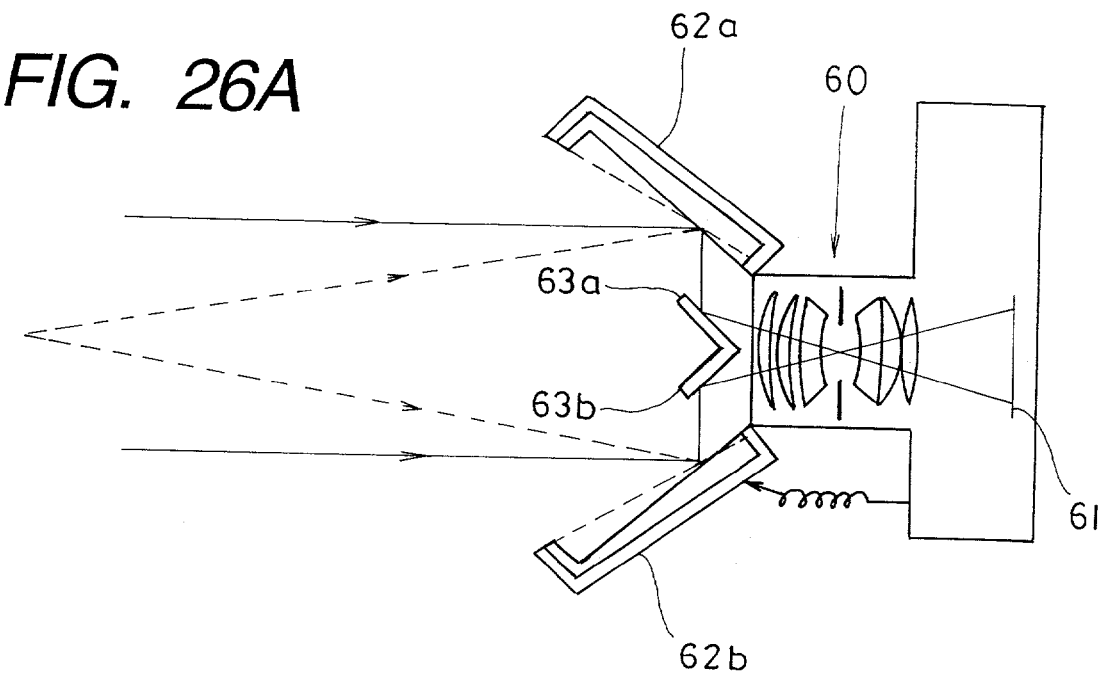
FIGS. 26A and 26B are diagrams showing a seventeenth embodiment of the present invention.
Figure 26B:
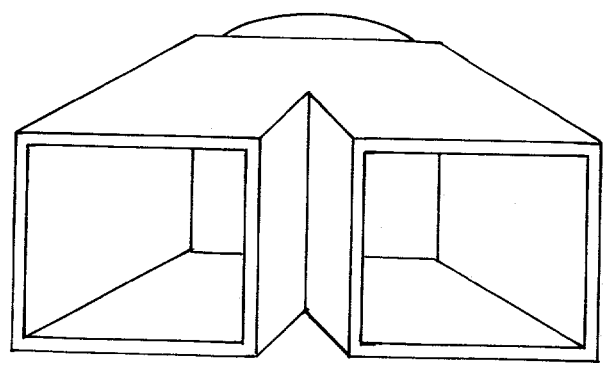

FIGS. 26A and 26B show an embodiment of an image pickup apparatus which is configured for obtaining a stereoscopically observable image by forming images of an identical object on a left half and a right half of an image pickup surface with slight parallax, and uses mirrors having variable shapes as some of a plurality of reflecting optical elements disposed on the object side of a photographic optical system for giving parallax between the left and right side images: FIG. 26A being a configurational diagram and FIG. 26B being a perspective view.

In FIGS. 26A and 26B, a reference numeral 60 represents a main lens system, a reference numeral 61 designates image pickup means such as an image pickup device like a CCD in a film surface, reference numerals 62*a*, 63*a*, 62*b* and 63*b* denote left and right reflecting optical elements, out of which 62*a* and 63*a* are the mirrors having the variable shapes.

This image pickup apparatus forms a stereoscopically observable image by reflecting left and right light bundles which are incident with slight parallax using the reflecting optical elements 62*a*, 63*a*, 62*b* and 63*b* respectively, and imaging the light bundles onto the left half and right half respectively of the image pickup means 61 using the main lens system 60.

This image pickup apparatus can be focused from an object located at an infinite distance onto an object located at a short distance by varying shapes of the left and right mirrors 62*a* and 63*a* having the variable shapes from shapes traced in solid lines to shapes traced in dashed lines.

An examples of a mirror having a variable shape (reflecting optical element having a variable shape) to be used in the image pickup apparatus according to the present invention will be described below.

Figure 27:
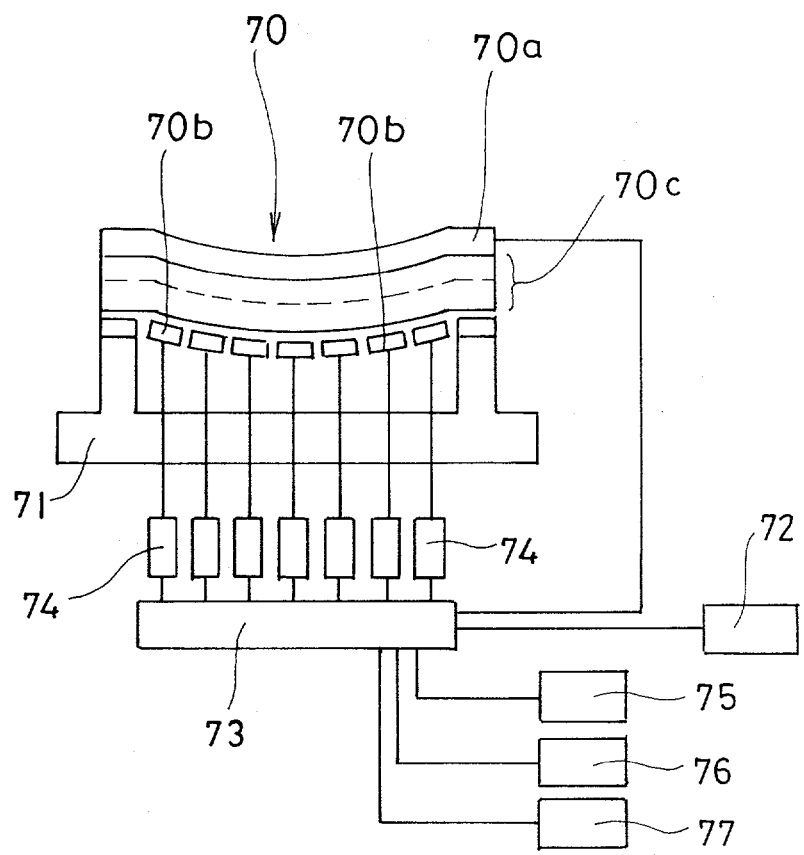
FIG. 27 is a diagram showing a configurational example of reflecting optical element having a variable shape to be used by the present invention.
Figure 28:
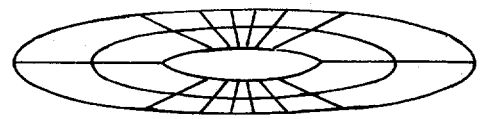
FIG. 28 is a diagram showing an example of electrode to be used in FIG. 27.
Figure 29:
FIG. 29 is a diagram showing another example of electrode to be used in FIG. 27.

FIG. 27 shows a mirror 70 having a variable shape consisting of a piezoelectric element 70 disposed between a thin film 70*a* and electrodes 70*b* which are disposed on a supporting base 71. Voltages which are to be applied to the piezoelectric element 70*c* are changed dependently on the electrodes 70*b* so as to cause different local elongations and contractions of the piezoelectric element 70*c*, thereby varying a shape of the thin film 70*a*. The electrode 70*b* may have a shape concentrically divided as shown in FIG. 28, rectangularly divided as shown in FIG. 29 or another adequately selectable shape. In the drawings, a reference numeral 72 blur sensor which is connected to an arithmetic unit 73 for detecting, for example, blur of a digital camera and changing voltages to be applied to the electrodes 70*b* by way of the arithmetic unit 73 and variable resistors 74 so that the shape of the thin film 70*a* is varied so as to compensate for image disturbance due to the blur. At this stage, focusing, temperature compensation and the like are also performed while simultaneously taking into consideration signals from a temperature sensor 75, a humidity sensor 76 and a distance sensor 77. In this case, it is preferable to configure the thin film 70*a* so as to have a thickness at a certain degree since a stress produced due to the variation of the shape of the piezoelectric element 70*c* is also applied to the thin film 70*a*.

The invention claimed is:

1. An image pickup apparatus comprising: an image pickup optical system which comprises, in order from the object side, a first lens unit disposed at a fixed location, comprising at least a negative lens element and at least a positive lens element and has negative refractive power, a second lens unit disposed next to said first lens unit and having positive refractive power, and an optical path bending reflecting optical element having a variable shape disposed between a most object side lens component of said first lens unit and a most object side lens component of said second lens unit, and is configured to change a magnification by moving only said second lens unit along an optical axis.

2. The image pickup apparatus according to claim 1, wherein a paraxial amount of said image pickup optical system is changed and aberrations are corrected by varying a surface shape of said reflecting optical element having the variable shape.

3. The image pickup apparatus according to claim 1, wherein a surface shape of said reflecting optical element having the variable shape is varied on the basis of lens control data for reducing an influence due to vibrations.

4. The image pickup apparatus according to claim 1, configured to control the shape of said reflecting optical element having the variable shape so that an image of a main object is nearly immovable on an image surface during exposure for a long time.

5. The image pickup apparatus according to claim 1, further comprising a multi-point range finding mechanism, wherein the shape of said reflecting optical element having the variable shape is varied so that the image pickup optical system is brought into focus on each point using data provided from said multi-point range finding mechanism.

6. The image pickup apparatus according to claim 1, wherein a surface shape of said reflecting optical element having the variable shape is varied so as to obtain optional aberration conditions in said image pickup optical system.

7. The image pickup apparatus according to claim 1, comprising an image pickup device, wherein a surface shape of said reflecting optical element having the variable shape is varied so as to change a focal length of said image pickup lens system in correspondence to a change of said image pickup device.

8. The image pickup apparatus according to claim 1, configured to control a surface shape of said reflecting optical element having the variable shape taking into consideration data of a paraxial amount or curvature of field in said image pickup optical system.

9. The image pickup apparatus according to claim 8, comprising: a view finder which automatically adjusts diopter by varying the surface shape of said reflecting optical element having the variable shape on the basis of data of a focused condition or a zoom condition of said image pickup optical system.

10. The image pickup apparatus according to claim 8, configured to vary the surface shape of said optical system having the variable shape on the basis of data of a focused condition or a zoom condition of said image pickup optical system.

11. The image pickup apparatus according to claim 8, configured to be capable of performing two or more of a spot light measurement, a multi-spot light measurement, a center weighted light measurement and center weighted mean light measurement and a pattern light measurement.

12. An image pickup apparatus comprising:
an image pickup optical system comprises, in order from the object side, a first lens unit having positive refractive power, a second lens unit having negative refractive power and an optical path bending reflecting surface having a variable shape which is disposed on the image side of a most image side optical component of said second lens unit, and is configured to change a magnification by moving said second lens unit along an optical axis,
wherein said second lens unit is moved only in a direction from said object side toward an image side to change the magnification from a wide position to a tele position, and
wherein a third lens unit is disposed successively to said second lens unit, and said third lens unit is kept stationary at a time of a change in magnification.

13. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein a paraxial amount of said image pickup optical system is changed and aberrations are corrected by varying the optical path bending reflecting surface having the variable shape.

14. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein the optical path bending reflecting surface having the variable shape is varied on the basis of lens control data for reducing an influence due to vibrations.

15. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein said image pickup apparatus is configured to control the optical path bending reflecting surface having the variable shape so that an image of a main object is nearly immovable on an image surface during exposure for a long time.

16. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein said image pickup apparatus further comprises a multi-point range finding mechanism, the optical path bending reflecting surface having the variable shape is varied so that the image pickup optical system is brought into focus on each point using data provided from said multi-point range finding mechanism.

17. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein the optical path bending reflecting surface having the variable shape is varied so as to obtain optional aberration conditions in said image pickup optical system.

18. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein said image pickup apparatus comprises an image pickup device, the optical path bending reflecting surface having the variable shape is varied so as to change a focal length of said image pickup lens system in correspondence to a change of said image pickup device.

19. An image pickup apparatus comprising: an image pickup optical system which comprises, in order from the object side, a first lens unit having positive refractive power, a second lens unit having negative refractive power and an optical path bending reflecting surface having a variable shape disposed on the image side of a most image side lens component of said second lens unit, and is configured to change a magnification by moving said second lens unit along an optical axis, wherein said image pickup apparatus is configured to control the optical path bending reflecting surface having the variable shape taking into consideration data of a paraxial amount or curvature of field in said image pickup optical system.

20. The image pickup apparatus according to claim 19, comprising: a view finder which automatically adjusts diopter by varying an optical path bending reflecting surface having the variable shape on the basis of data of a focused condition or a zoom condition of said image pickup optical system.

21. The image pickup apparatus according to claim 19, configured to vary the optical path bending reflecting surface having the variable shape on the basis of data of a focused condition or a zoom condition of said image pickup optical system.

22. The image pickup apparatus according to claim 19, configured to be capable of performing two or more of a spot light measurement, a multi-spot light measurement, a center weighted light measurement and center weighted mean light measurement and a pattern light measurement.

* * * * *